(12) United States Patent
Park et al.

(10) Patent No.: US 12,425,964 B2
(45) Date of Patent: Sep. 23, 2025

(54) METHOD AND DEVICE FOR CARRYING OUT TIMER-BASED POWER SAVING IN NR V2X

(71) Applicant: LG ELECTRONICS INC., Seoul (KR)

(72) Inventors: Giwon Park, Seoul (KR); Seoyoung Back, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 460 days.

(21) Appl. No.: 17/905,966

(22) PCT Filed: Mar. 11, 2021

(86) PCT No.: PCT/KR2021/003013
§ 371 (c)(1),
(2) Date: Sep. 9, 2022

(87) PCT Pub. No.: WO2021/182884
PCT Pub. Date: Sep. 16, 2021

(65) Prior Publication Data
US 2023/0104340 A1    Apr. 6, 2023

(30) Foreign Application Priority Data

Mar. 11, 2020  (KR) .................. 10-2020-0030096
May 14, 2020  (KR) .................. 10-2020-0057790
(Continued)

(51) Int. Cl.
*H04W 52/02*    (2009.01)
*H04W 76/23*    (2018.01)
*H04W 76/28*    (2018.01)

(52) U.S. Cl.
CPC ....... *H04W 52/0216* (2013.01); *H04W 76/23* (2018.02); *H04W 76/28* (2018.02)

(58) Field of Classification Search
None
See application file for complete search history.

(56) References Cited

U.S. PATENT DOCUMENTS

2019/0174411 A1  6/2019  Xu et al.
2020/0029318 A1  1/2020  Guo
(Continued)

FOREIGN PATENT DOCUMENTS

WO    2020-033704    2/2020

OTHER PUBLICATIONS

European Patent Office Application Serial No. 21768671.6, Search Report dated Mar. 5, 2024, 9 pages.
(Continued)

*Primary Examiner* — Walter J Divito
(74) *Attorney, Agent, or Firm* — LEE, HONG, DEGERMAN, KANG & WAIMEY

(57) ABSTRACT

Proposed is an operation method of a first device (100) in a wireless communication system. The method may comprise the steps of: starting a first timer associated with an on-duration period; receiving, from a second device (200) via a physical sidelink control channel (PSCCH), first sidelink control information (SCI) for the scheduling of second SCI; receiving, from the second device (200) via a physical sidelink shared channel (PSSCH), the second SCI, which includes a 16-bit first destination identifier (ID), and a medium access control (MAC) header, which includes an eight-bit second destination ID; acquiring a third destination ID on the basis of the first destination ID and the second destination ID; comparing the third destination ID with a 24-bit first source ID of a first device (100); starting a second
(Continued)

timer on the basis of the first source ID which is the same as the third destination ID; and carrying out sidelink communication with the second device (200) on the basis of the second timer which is operating.

13 Claims, 25 Drawing Sheets

(30) Foreign Application Priority Data

Oct. 27, 2020 (KR) .................. 10-2020-0140275
Feb. 18, 2021 (KR) .................. 10-2021-0022152

(56) References Cited

U.S. PATENT DOCUMENTS

| | | | |
|---|---|---|---|
| 2020/0037343 A1 | 1/2020 | He et al. | |
| 2022/0150730 A1* | 5/2022 | Freda | H04L 1/188 |
| 2023/0345559 A1* | 10/2023 | Li | H04W 72/0446 |

OTHER PUBLICATIONS

3rd Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.12.0, Dec. 2019, 110 pages.
Samsung, "On Physical Layer Procedures for NR V2X," R1-1901048, 3GPP TSG RAN WG1 Ad-Hoc Meeting 1901, Jan. 2019, 11 pages.
PCT International Application No. PCT/KR2021/003013, International Search Report dated Jun. 17, 2021, 4 page.
Huawei et al., "Discussion on HARQ support for NR sidelink," R2-1915968, 3GPP TSG-RAN WG2 #108, Nov. 2019, 6 pages.
VIVO, "Physical layer structure for NR sidelink," R1-1912020, 3GPP TSG RAN WG1 #99 Meeting, Nov. 2019, 23 pages.
CATT, "Discussion on Unicast Connection Setup Procedure," R2-1908737, 3GPP TSG-RAN WG2 Meeting #107, Aug. 2019, 11 pages.

* cited by examiner

FIG. 4
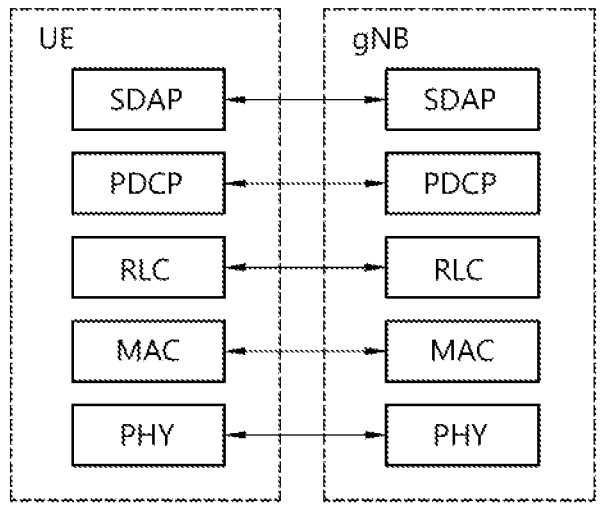
(a)
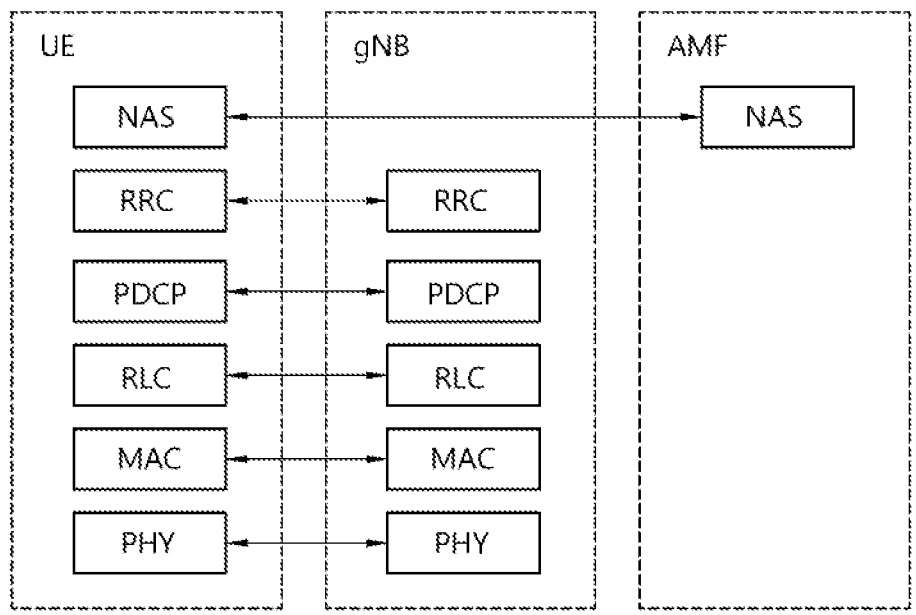
(b)

FIG. 8
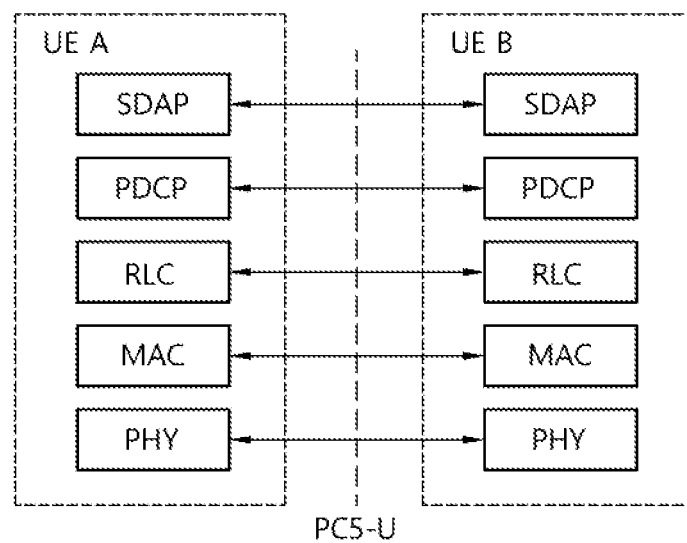
(a)
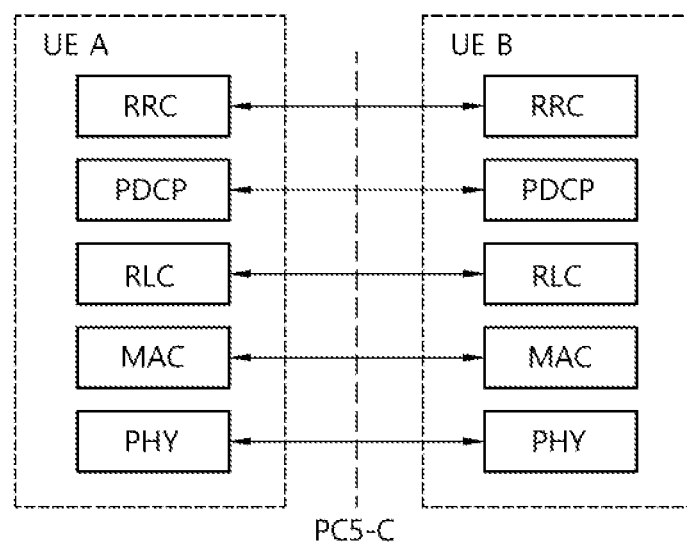
(b)

METHOD AND DEVICE FOR CARRYING OUT TIMER-BASED POWER SAVING IN NR V2X

CROSS-REFERENCE TO RELATED APPLICATION(S)

This application is the National Stage filing under 35 U.S.C. 371 of International Application No. PCT/KR2021/003013, filed on Mar. 11, 2021, which claims the benefit of earlier filing date and right of priority to Korean Application Nos. 10-2020-0030096, filed on Mar. 11, 2020, 10-2020-0057790, filed on May 14, 2020, 10-2020-0140275, filed on Oct. 27, 2020, and 10-2021-0022152, filed on Feb. 18, 2021, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, a CAM may include basic vehicle information such as vehicle dynamic state information such as direction and speed, vehicle static data such as dimensions, external lighting conditions, and route details. For example, a UE may broadcast a CAM, and CAM latency may be less than 100 ms. For example, when an unexpected situation such as a breakdown of a vehicle or an accident occurs, a UE may generate a DENM and transmit it to another UE. For example, all vehicles within the transmission range of a UE may receive a CAM and/or a DENM. In this case, a DENM may have a higher priority than a CAM.

Thereafter, regarding V2X communication, various V2X scenarios are proposed in NR. For example, the various V2X scenarios may include vehicle platooning, advanced driving, extended sensors, remote driving, or the like.

For example, based on vehicle platooning, vehicles can be dynamically grouped and moved together. For example, to perform platoon operations based on vehicle platooning, vehicles belonging to a group may receive periodic data from a leading vehicle. For example, the vehicles belonging to the group may reduce or widen the distance between the vehicles by using periodic data.

For example, based on improved driving, a vehicle can be semi-automated or fully automated. For example, each vehicle may adjust trajectories or maneuvers based on data obtained from local sensors of the proximate vehicle and/or proximate logical entity. Also, for example, each vehicle may share driving intention with adjacent vehicles.

For example, based on an extended sensors, raw data or processed data, or live video data obtained through local sensors, may be interchanged between vehicles, logical entities, pedestrian terminals and/or V2X application servers. For example, a vehicle may recognize an environment that is improved compared to an environment that can be detected using its own sensor.

F or example, based on remote driving, for a person who cannot drive or a remote vehicle located in a dangerous environment, a remote driver or V2X application may operate or control the remote vehicle. For example, when a route can be predicted, such as in public transportation, cloud computing-based driving may be used to operate or control the remote vehicle. Also, for example, access to a cloud-based back-end service platform may be considered for remote driving.

Meanwhile, a method of specifying service requirements for various V2X scenarios such as vehicle platooning, enhanced driving, extended sensors, and remote driving is being discussed in NR-based V2X communication.

SUMMARY OF THE DISCLOSURE

Technical Solutions

According to an embodiment, a method of operating a first device 100 in a wireless communication system is proposed. The method may comprise: starting a first timer related to an on-duration; receiving first sidelink control information (SCI) for scheduling of second SCI, from a second device 200, through a physical sidelink control channel (PSCCH); receiving the second SCI including a 16-bit first destination identifier (ID) and a medium access control (MAC) header including an 8-bit second destination ID, from the second device 200, through a physical sidelink shared channel (PSSCH); obtaining a third destination ID based on the first destination ID and the second destination ID; comparing the third destination ID and a 24-bit first source ID of the first device; starting a second timer based on the first source ID which is same with the third destination ID; and performing sidelink communication with the second device 200, based on the running second timer.

Effects of the Disclosure

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
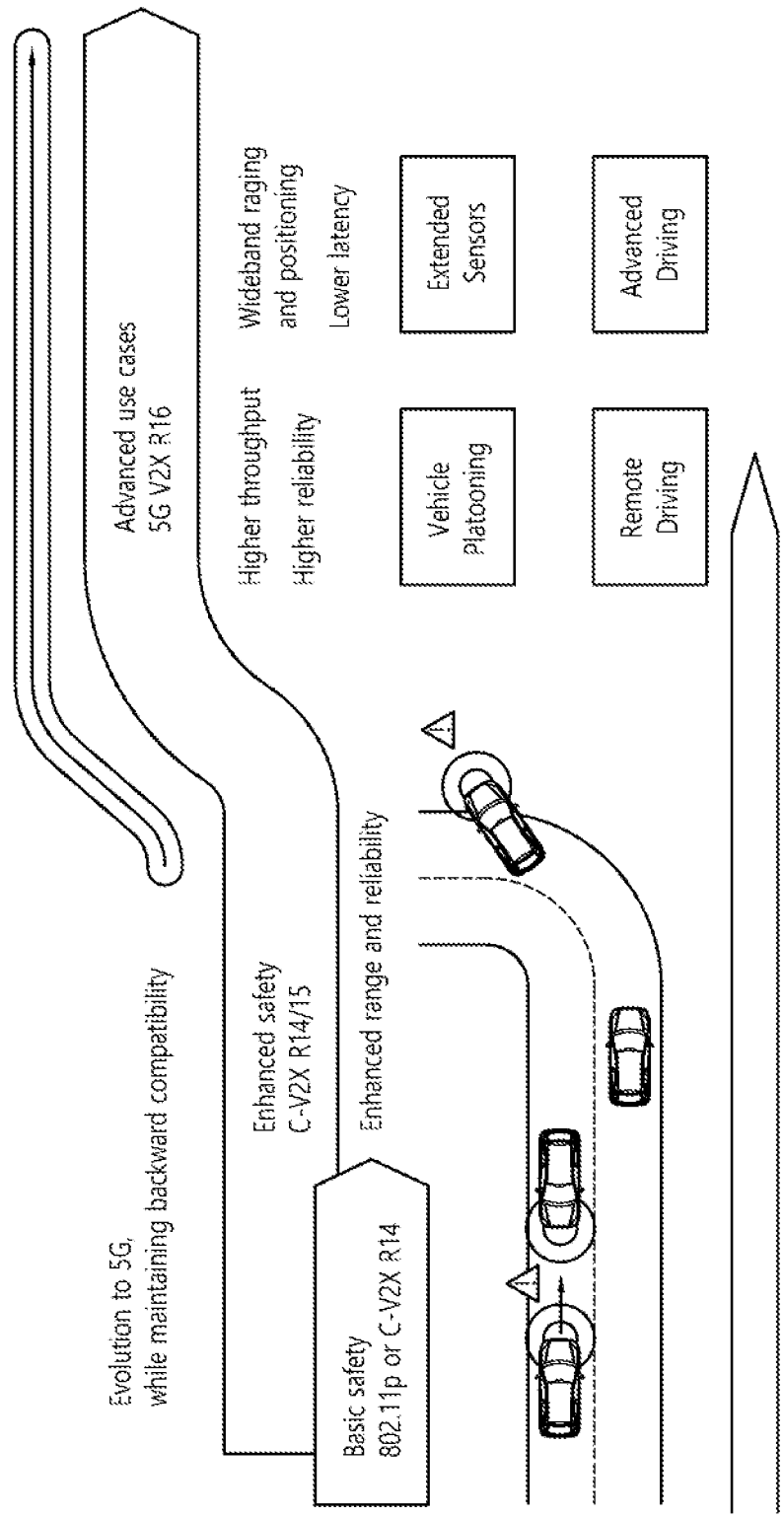
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
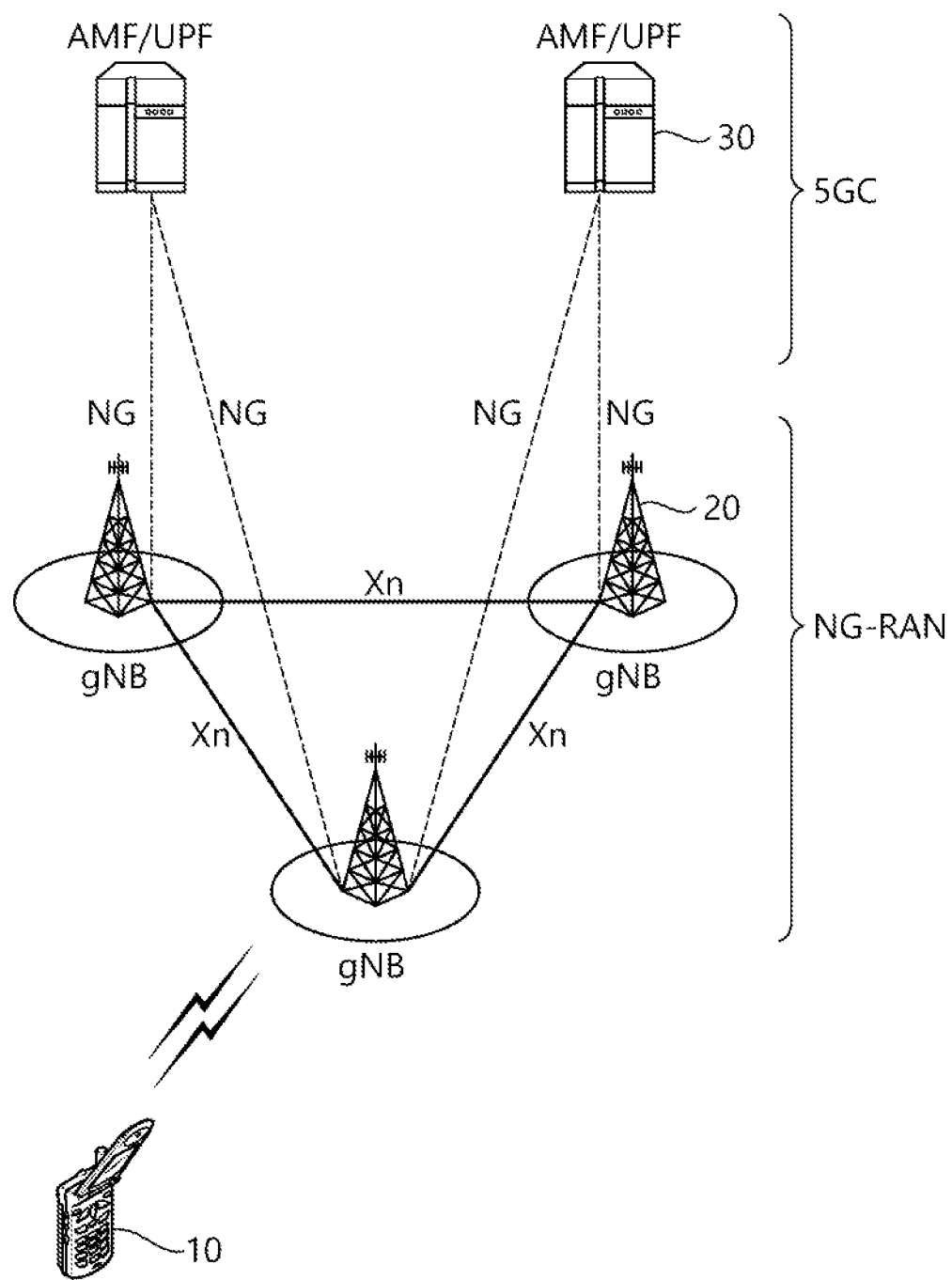
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
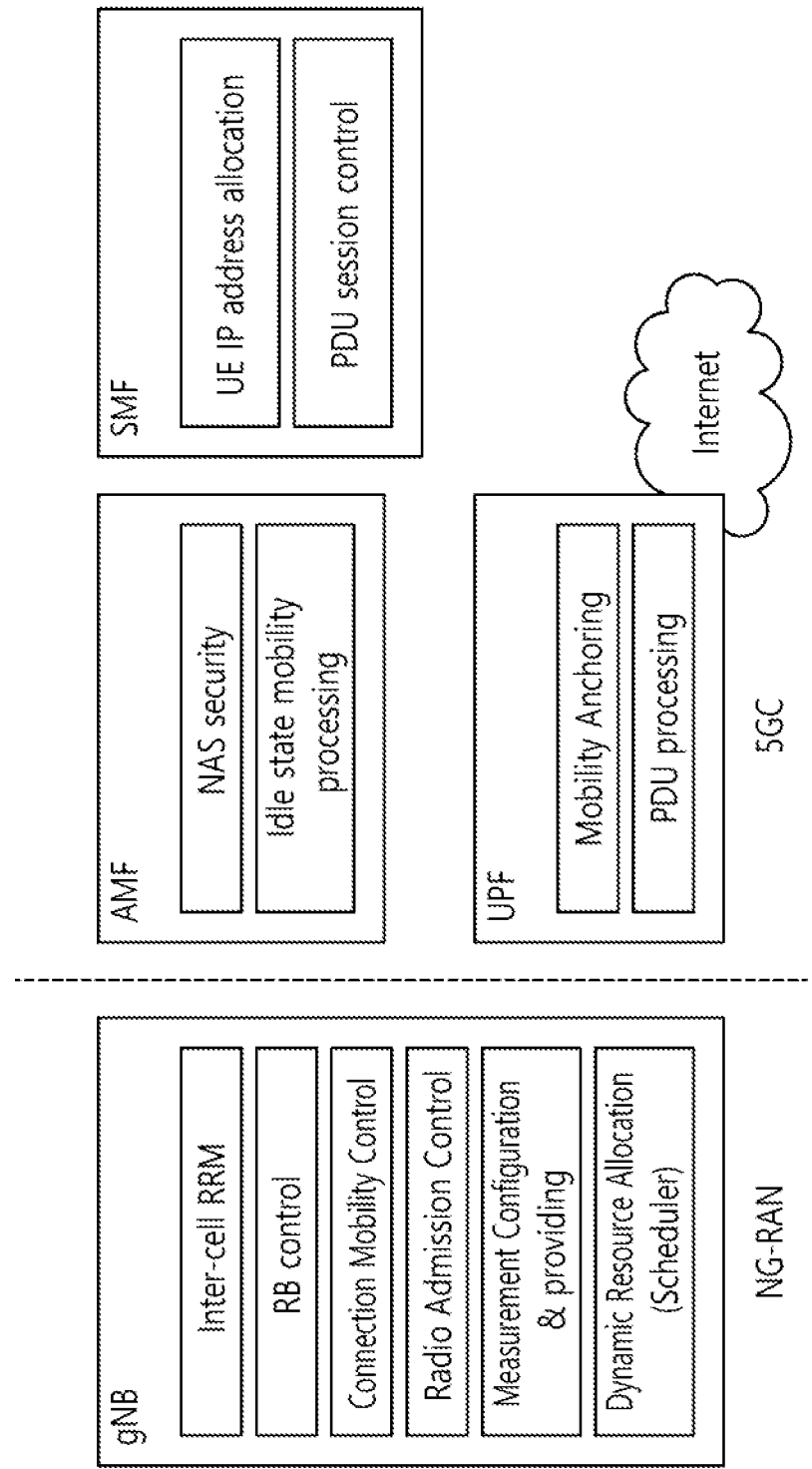
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
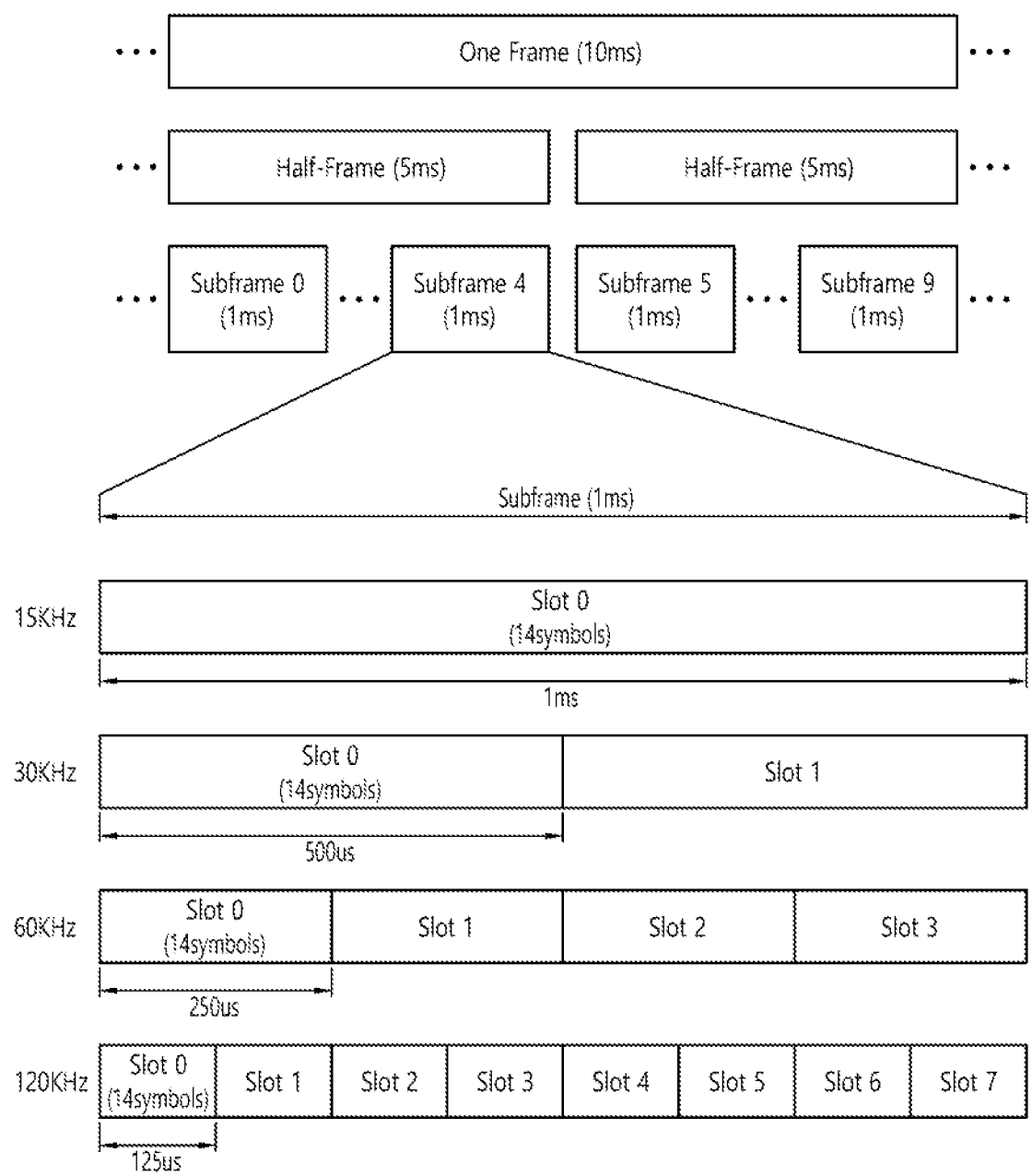
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or period) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz–7125 MHz | 15, 30, 60 kHz |
| FR2 | 24250 MHz–52600 MHz | 60, 120, 240 kHz |

Figure 6:
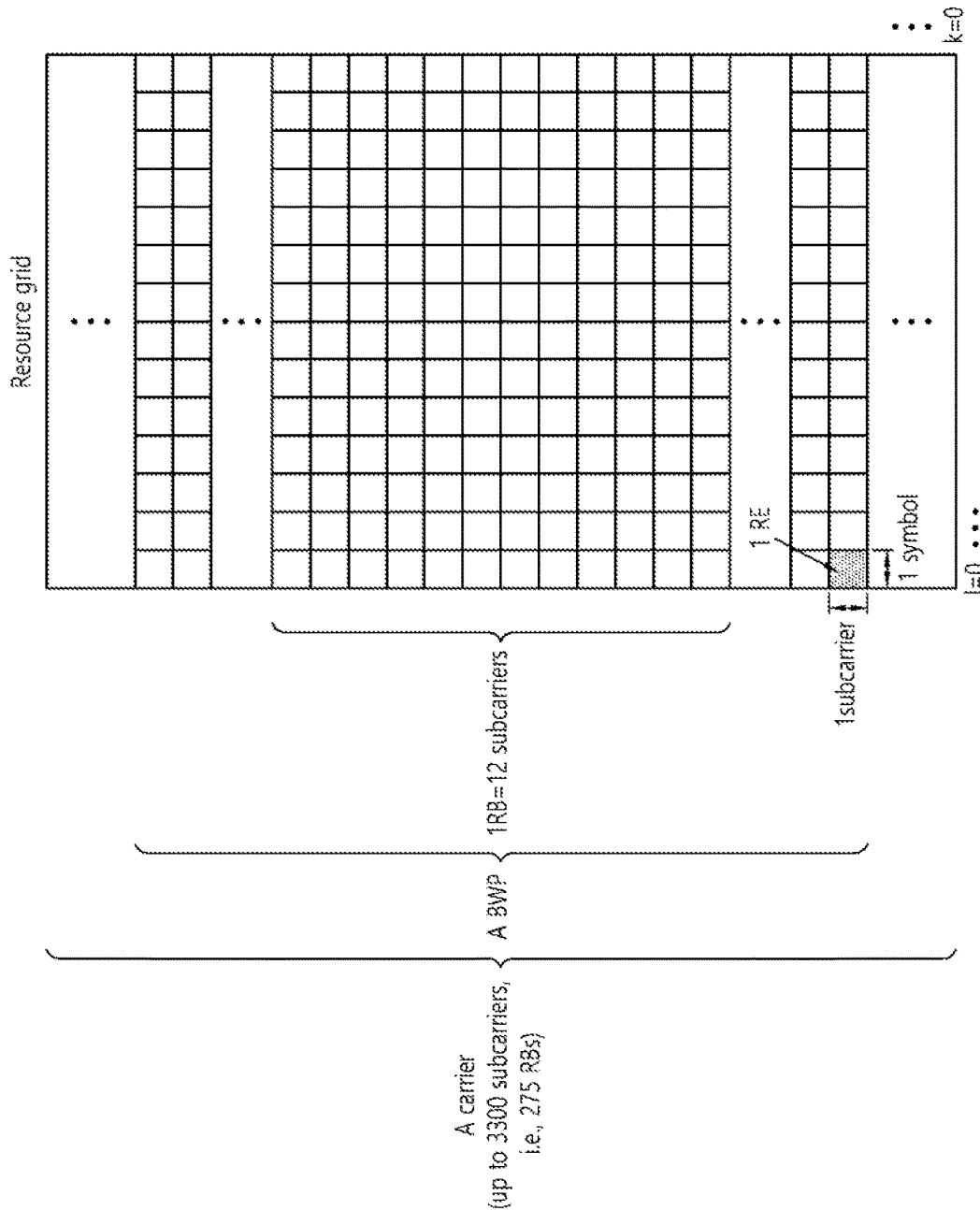
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
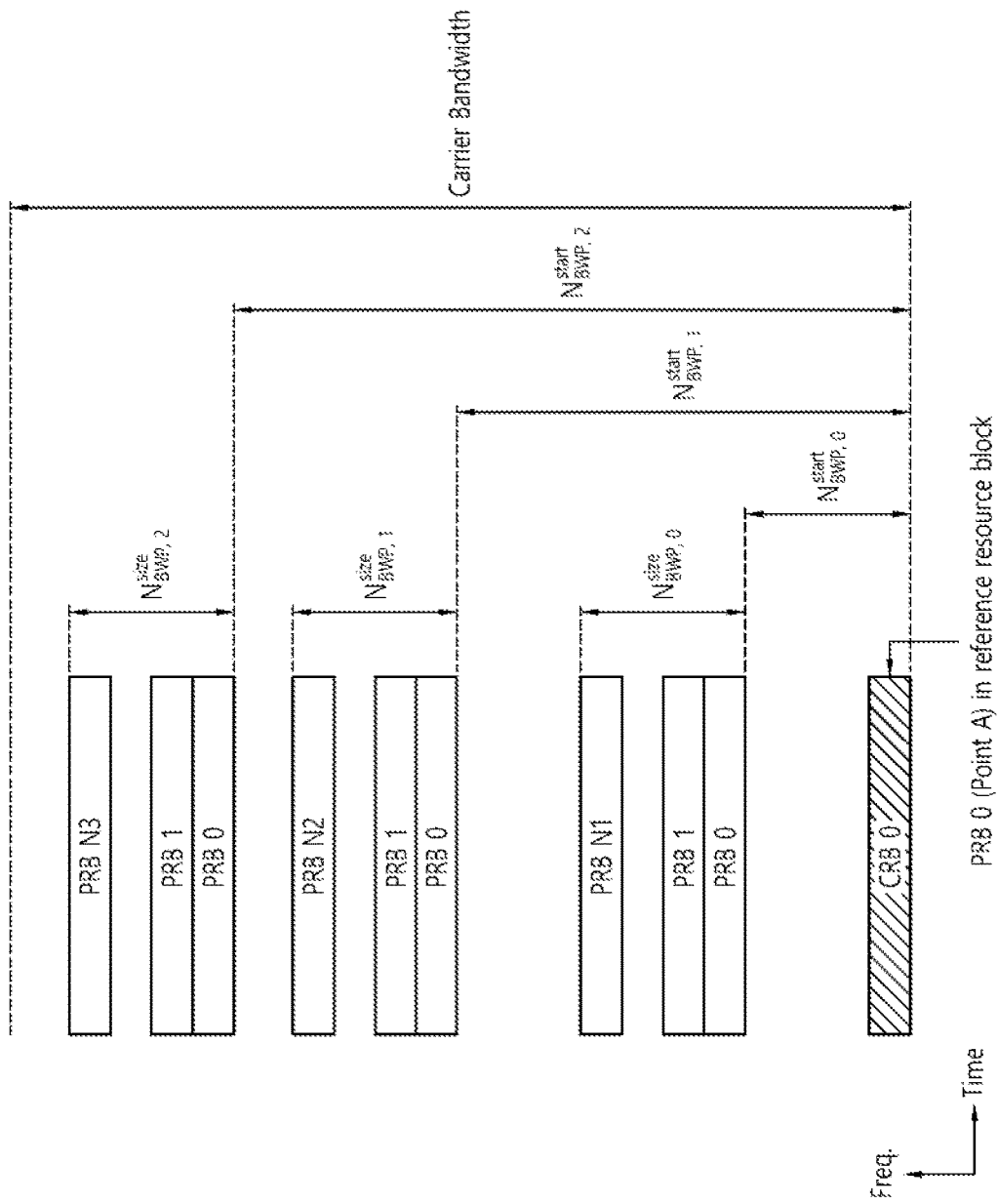
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
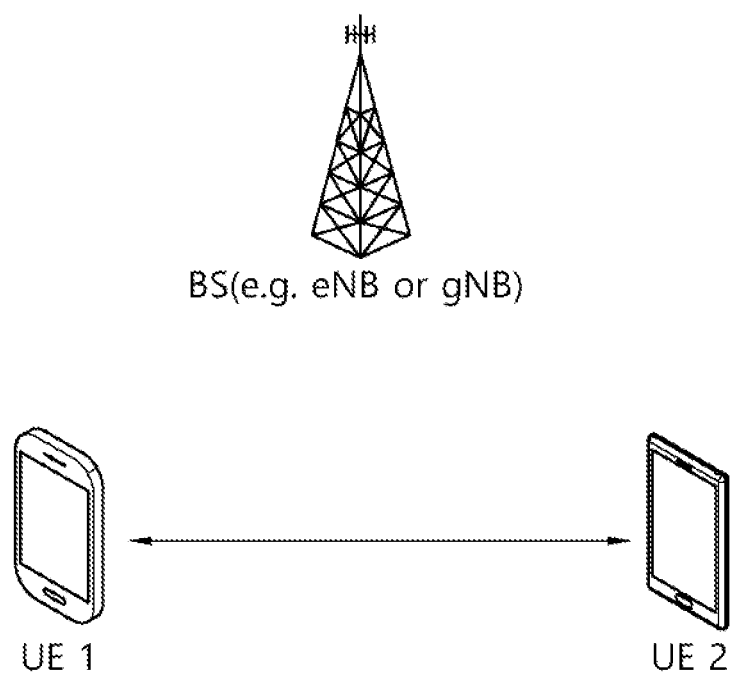
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
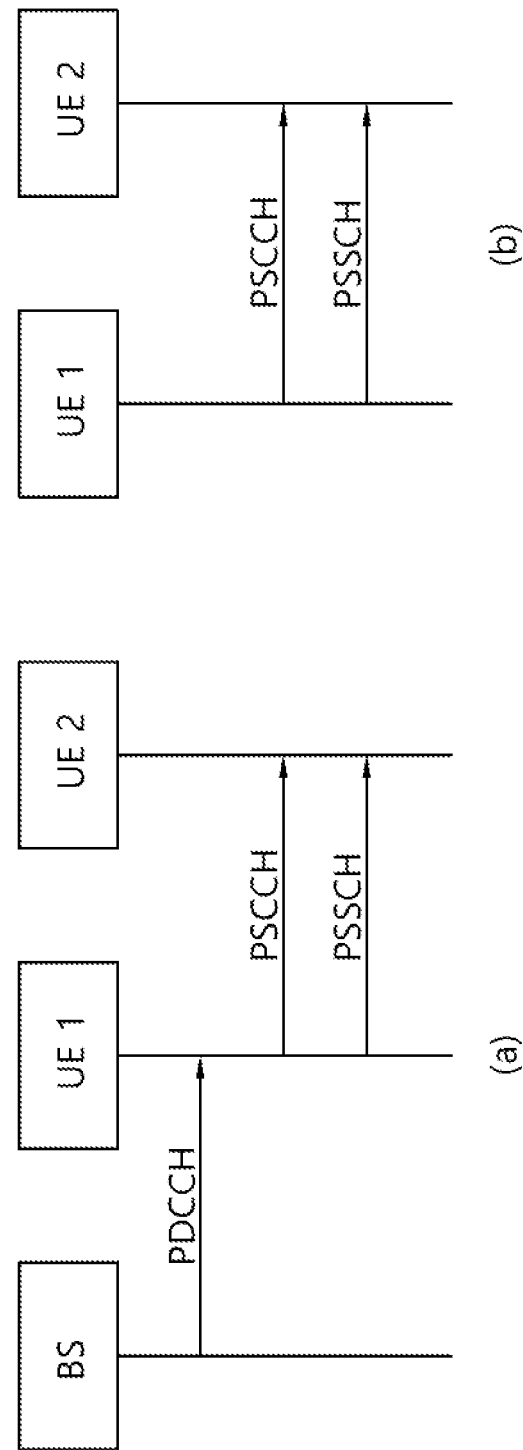
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
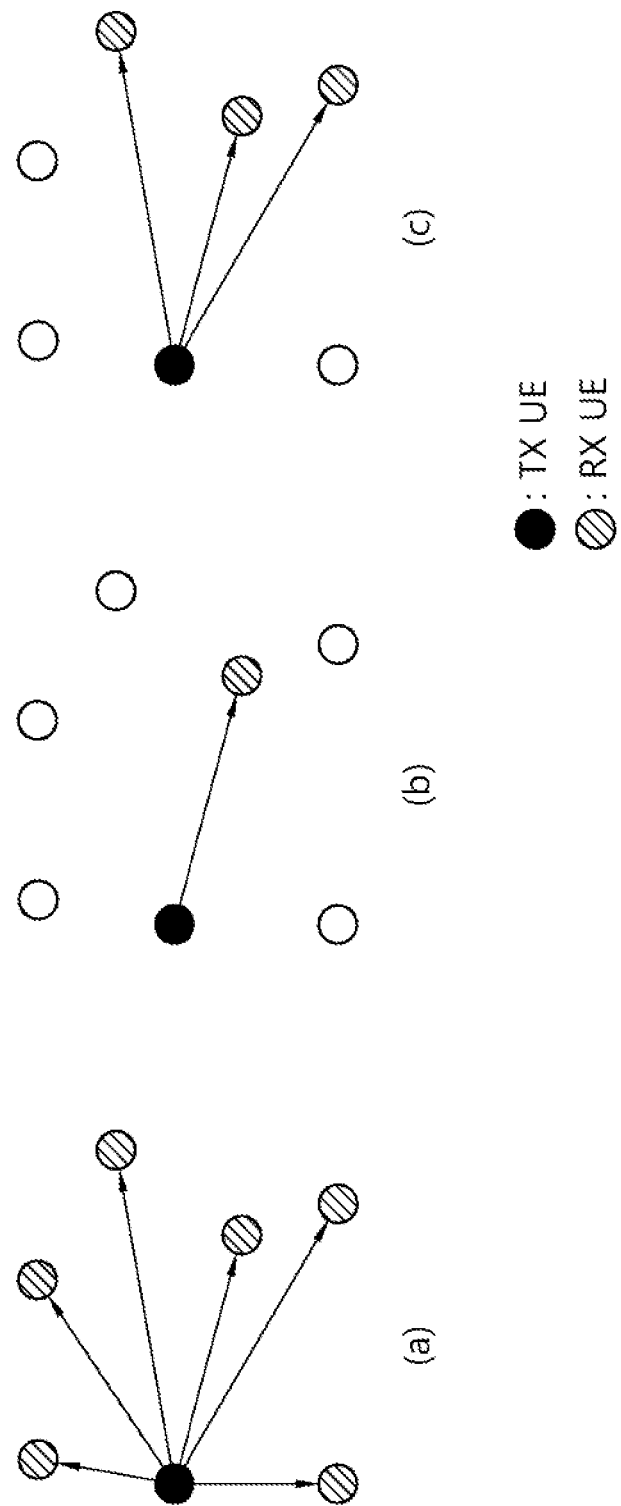
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on an initial priority indication of the related PSCCH/PSSCH.

In this disclosure, for example, transmission user equipment (TX UE) may mean a transmitting UE and may be referred to as a transmitting terminal. Also, for example, reception user equipment (RX UE) may mean a reception UE and may be referred to as a reception terminal. Also, for example, a UE may mean a UE and may be referred to as a terminal.

On the other hand, NR V2X of Release 16 did not support the power saving operation of a UE, and it is planned to support the power saving operation of a UE from release 17 NR V2X.

In the Uu DRX operation according to the prior art, by defining drx-InactivityTimer, when a UE receives a new transport block (TB) from a base station or transmits a new TB to the base station, a UE does not transition to a sleep state and remains in an active state so that communication between the UE and the base station is continuously guaranteed, even if the drx on-duration period expires, drx-InactivityTimer is started to extend a DRX on-duration period while drx-InactivityTimer expires.

According to an embodiment of the present disclosure, a sidelink (SL) drx-InactivityTimer is defined and a new condition to start the SL drx-InactivityTimer is also defined, and a method that can operate so that a UE can continue to guarantee SL transmission in NR V2X by extending an active state without transitioning to a sleep state is proposed. An SL drx-InactivityTimer proposed in the present disclosure may be a timer defined to support an SL operation (e.g., sidelink transmission or sidelink reception) of a UE, for example, it may be a timer defined for the purpose of extending on-duration or active time for a UE to transmit or receive a sidelink signal. Alternatively, an SL drx-InactivityTimer proposed in the present disclosure may be a timer defined to support an SL operation of a UE. That is, it may be a timer defined for the purpose of extending on-duration or active time in order for a UE to monitor (or receive) a signal of a base station. Or, for example, in the following description, 'when, if, or in case of' may be replaced with 'based on'.

Hereinafter, an operation method related to an SL drx-InactivityTimer, an SL DRX active timer of a UE, and/or an SL DRX timer for allowing the UE in an SL DRX operation to operate in an active time is proposed. For example, when an SL DRX timer of the present disclosure is operating, a UE may operate in active time. For example, when an SL DRX timer of the present disclosure is operating, a UE may operate in active time regardless of on-duration or off-duration. For example, an SL DRX timer of the present disclosure may include SL drx-InactivityTimer, SL DRX active timer, SL DRX-RetransmissionTimer and/or SL DRX HARQ RTT timer, etc. For example, even taking an SL drx-InactivityTimer as an example in the embodiment of the present disclosure, this may mean all timers included in an SL DRX timer.

According to an embodiment of the present disclosure, in Table 5 below, a method for a UE to perform a power saving operation based on a sidelink DRX configuration is proposed. Specifically, an operation method of SL drx-InactivityTimer and/or SL DRX timer that can be applied to extend or complete an on-duration period of SL DRX, or to allow a UE to operate in active time in SL DRX is proposed.

Table 5 shows a description of terms related to sidelink DRX configuration.

TABLE 5

Sidelink DRX configurations

SL drx-onDurationTimer: the duration at the beginning of a DRX Cycle;
SL drx-SlotOffset: the delay before starting the drx-onDurationTimer;
SL drx-InactivityTimer: the duration after the PSCCH occasion in which a PSCCH indicates a new SL transmission for the MAC entity;
SL drx-RetransmissionTimer (per HARQ process or per Sidelink process): the maximum duration until a retransmission is received;
SL drx-LongCycleStartOffset: the Long DRX cycle and drx-StartOffset which defines the subframe where the Long and Short DRX Cycle starts;
SL drx-ShortCycle (optional): the Short DRX cycle;
SL drx-ShortCycleTimer (optional): the duration the UE shall follow the Short DRX cycle;
SL drx-HARQ-RTT-Timer (per HARQ process or per Sidelink process): the minimum duration before a assignment for HARQ retransmission is expected by the MAC entity.

According to an embodiment of the present disclosure, when at least one or more of the following conditions are satisfied, a TX UE may start SL drx-InactivityTimer. While an SL drx-InactivityTimer is running, a UE may continue to perform SL communication by maintaining an active state. An SL drx-InactivityTimer operated by a Tx UE may be a timer operated for the purpose of synchronizing with an SL drx-InactivityTimer operated by an Rx UE for an SL DRX operation of the Rx UE. That is, the Tx UE may consider that the Rx UE (re)starts or stops the SL drx InactivityTimer if the following conditions are satisfied.

1. When a TX UE transmits PSCCH (1st Sidelink Control Information) and/or PSSCH (2nd Sidelink Control Information) related to PSSCH (SL data) to an RX UE.

2. When a TX UE transmits a new TB to an RX UE (PSSCH transmission: SL data).

3. When a corresponding HARQ Feedback (ACK/NACK or NACK) for PSSCH transmission is received from an RX UE (PSFCH reception). In addition, when a Tx UE receives SL HARQ NACK from an Rx UE as much as the maximum threshold value, the Tx UE may stop the SL drx-InactivityTimer.

4. When a Tx UE receives the corresponding HARQ Feedback (HARQ ACK and/or HARQ NACK) for PSSCH transmission from an RX UE and transmits the SL HARQ feedback to a base station through a PUCCH. In addition, a Tx UE may stop the SL drx-InactivityTimer when transmitting an SL HARQ ACK through a PUCCH, to indicate a base station that retransmission resources are no longer needed because the TX UE has received SL HARQ NACK from an Rx UE by the maximum threshold value.

5. When the corresponding HARQ Feedback (ACK or NACK) for PSCCH/PSSCH transmission is not received from an RX UE (SL HARQ DTX detection). In addition, a Tx UE may stop an SL drx-InactivityTimer when an SL HARQ DTX occurs as much as the maximum threshold value (SL RLF occurs).

6. When an SL HARQ DTX is reported from a physical layer to a MAC layer because the corresponding HARQ Feedback (ACK or NACK) for PSCCH/PSSCH transmission is not received from an RX UE (SL HARQ DTX detection).

7. In case PSCCH/PSSCH is transmitted to an RX UE and PSFCH monitoring is not performed due to half duplex problem (problem that occurs because a UE cannot transmit and receive at the same time). (If where was no half duplex problem, it may be necessary to start an SL drx-InactivityTimer because it may have received the SL HARQ Feedback transmitted by an RX UE by monitoring a PSFCH).

According to an embodiment of the present disclosure, when at least one or more of the following conditions are satisfied, a TX UE may start SL drx-InactivityTimer. An SL drx-InactivityTimer proposed in this disclosure may be a timer defined to support an SL operation of a UE. That is, it may be a timer that a UE defines for the purpose of extending on-duration or active time to monitor (or receive) a signal of a base station or to operate in an active time. For example, a Tx UE may (re)start or stop an SL drx-InactivityTimer for monitoring of SL Mode 1 DCI (and/or PDCCH) transmitted by a base station or an SL DRX timer that can be applied to allow a UE to operate in active time in SL DRX when the following conditions are met.

1. When a TX UE transmits PSCCH (1st Sidelink Control Information) and/or PSSCH (2nd Sidelink Control Information) related to PSSCH (SL data) to an RX UE.

2. When a TX UE transmits a new TB to an RX UE (PSSCH transmission: SL data).

3. When a corresponding HARQ Feedback (ACK/NACK or NACK) for PSSCH transmission is received from an RX UE (PSFCH reception). In addition, when a Tx UE receives SL HARQ NACK from an Rx UE as much as the maximum threshold value, the Tx UE may stop the SL drx-InactivityTimer.

4. When a Tx UE receives the corresponding HARQ Feedback (HARQ ACK and/or HARQ NACK) for PSSCH transmission from an RX UE and transmits the SL HARQ feedback to a base station through a PUCCH. In addition, a Tx UE may stop the SL drx-InactivityTimer when transmitting an SL HARQ ACK through a PUCCH, to indicate a base station that retransmission resources are no longer needed because the TX UE has received SL HARQ NACK from an Rx UE by the maximum threshold value.

5. When the corresponding HARQ Feedback (ACK or NACK) for PSCCH/PSSCH transmission is not received from an RX UE (SL HARQ DTX detection). In addition, a Tx UE may stop an SL drx-InactivityTimer when an SL HARQ DTX occurs as much as the maximum threshold value (SL RLF occurs).

6. When an SL HARQ DTX is reported from a physical layer to a MAC layer because the corresponding HARQ Feedback (ACK or NACK) for PSCCH/PSSCH transmission is not received from an RX UE (SL HARQ DTX detection).

7. In case PSCCH/PSSCH is transmitted to an RX UE and PSFCH monitoring is not performed due to half duplex problem (problem that occurs because a UE cannot transmit and receive at the same time). (If where was no half duplex problem, it may be necessary to start an SL drx-InactivityTimer because it may have received the SL HARQ Feedback transmitted by an RX UE by monitoring a PSFCH).

According to an embodiment of the present disclosure, a method for allowing an RX UE to start SL drx-InactivityTimer when satisfying at least one of the following conditions is proposed. While an SL drx-InactivityTimer is running, a UE may continue to perform SL communication (SL transmission and/or SL reception) by maintaining an active state.

1. When an RX UE receives Sidelink Control Information (1st SCI and/or 2nd SCI) transmitted by a TX UE.

2. When an Rx UE receives a new TB (SL data) transmitted by a TX UE (PSSCH reception).

3. When the corresponding HARQ feedback (ACK/NACK or NACK) for the reception of a PSSCH (SL data) transmitted by a TX UE is transmitted to the TX UE (PSFCH transmission), a timer may be started. In addition, when an Rx UE transmits SL HARQ NACK to a Tx UE as much as the maximum threshold value, an SL drx-InactivityTimer may be stopped and it may transition to a sleep state.

4. If only decoding for a PSCCH transmitted by a TX UE succeeds (PSSCH decoding fails), or, for example, if SL HARQ feedback (SL HARQ ACK and/or SL HARQ NACK) cannot be transmitted for the following reasons even though decoding is successful for both PSCCH and PSSCH, since it is necessary to receive a retransmission SL data transmitted by the TX UE, it may be possible to start an SL drx-InactivityTimer. Or, for example, it may be allowed to receive a retransmission packet transmitted by a Tx UE by remaining in an SL active time.

4-1. When UL data to be transmitted to a base station occurs simultaneously with SL data to be transmitted to a counterpart UE (e.g., SL HARQ feedback), an RX UE may perform priority comparison on SL data and UL data and transmit data with higher priority first. For example, if the priority of UL data is high in priority comparison, the problem of transmitting UL data to a base station may occur without transmitting SL HARQ feedback to a TX UE.

4-2. When an RX UE has NR SL data (e.g., SL HARQ feedback) to transmit to the other UE, and also has LTE SL data at the same time, the RX UE may compare the NR SL data and the LTE SL data with priority and transmit data having a higher priority first. For example, if the priority of LTE SL data in priority comparison is high, there may be a problem in that SL HARQ feedback cannot be transmitted to a TX UE.

According to an embodiment of the present disclosure, for the case where an RX UE receives sidelink control information transmitted by a TX UE, a method for allowing the RX UE to start SL drx-InactivityTimer when satisfying at least one of the following conditions is proposed. For example, the sidelink control information may include a Layer 1 ID. While an SL drx-InactivityTimer is running, a UE may continue to perform SL communication (SL transmission and/or SL reception) by maintaining an active state.

Method 1. (In the case of Unicast, Groupcast, and/or Broadcast) an RX UE may start SL drx-InactivityTimer when receiving sidelink control information transmitted by a TX UE.

Method 2. An RX UE may receive Sidelink Control Information transmitted by a TX UE. For example, in the case of unicast transmission, when an RX UE receives the SCI transmitted by the TX UE, the RX UE may start an SL drx-InactivityTimer only when the layer 1 partial destination ID included in the SCI matches the layer 1 partial source ID of the RX UE itself.

Method 3. An RX UE may receive Sidelink Control Information transmitted by a TX UE. For example, for unicast transmission, an RX UE may start an SL drx-InactivityTimer only when it is confirmed that a layer 1 partial source ID included in SCI is the same as a layer 1 partial source ID of the peer TX UE that has established a unicast connection with itself. For example, the layer 1 partial source ID of the peer TX UE may be the RX UE's own Unicast layer 1 partial destination ID.

Method 4. An RX UE may receive Sidelink Control Information transmitted by a TX UE. For example, in the case of unicast transmission, when an RX UE receives the SCI transmitted by the TX UE, the RX UE may check the address field of the PSSCH's MAC header related to the PSCCH (SCI) when a layer 1 partial destination ID included in SCI matches a layer 1 partial source ID of an RX UE itself, and if a layer 1 partial source ID included in the SCI is the same as a layer 1 partial source ID of the peer TX UE that has established a unicast connection with itself. For example, the layer 1 partial source ID of the peer TX UE may be the RX UE's own Unicast layer 1 partial destination ID. That is, an RX UE may start an SL drx-InactivityTimer only when a 24-bit destination ID is the same as its 24-bit source ID by combining a 16-bit destination ID included in SCI and an 8-bit destination ID included in a MAC header.

Method 5. An RX UE may receive Sidelink Control Information (PSCCH) transmitted by a TX UE. For example, in the case of unicast transmission, when an RX UE receives the SCI transmitted by the TX UE, when a layer 1 partial destination ID included in SCI matches a layer 1 partial source ID of the RX UE itself, and if a layer 1 partial source ID included in the SCI is the same as a layer 1 partial source ID of the peer TX UE that has established a unicast connection with itself, the RX UE may check the address field of the PSSCH (related to a PSCCH(SCI))'s MAC header. For example, the Peer TX UE's layer 1 partial source ID may be the RX UE's Unicast layer 1 partial Destination ID itself. That is, if a 24-bit Destination ID, which is a combination of a 16-bit destination ID included in SCI and an 8-bit destination ID included in a MAC Header, is the same as its 24-bit Source ID, and only when a 24-bit source ID, which is a combination of an 8-bit source ID included in the SCI and a 16-bit source ID included in the MAC header, matches the 24-bit unicast destination ID with which it has established a unicast connection, an RX UE may start SL drx-InactivityTimer.

Method 6. An RX UE may receive Sidelink Control Information (PSCCH) transmitted by a TX UE. For example, in the case of groupcast transmission, when an RX UE receives SCI transmitted by a TX UE, the RX UE may start SL drx-InactivityTimer only when a layer 1 partial destination ID for a 24 bit groupcast ID included in SCI matches a layer 1 partial destination ID for a 24 bit groupcast ID of the RX UE itself.

Method 7. An RX UE may receive Sidelink Control Information (PSCCH) transmitted by a TX UE. For example, in the case of groupcast transmission, when an RX UE receives SCI transmitted by a TX UE, the RX UE may check the remaining address IDs included in the address field of a PSSCH's MAC header related to a PSCCH (SCI) only when a layer 1 partial destination ID for a 24 bit groupcast ID included in SCI matches a layer 1 partial destination ID for a 24 bit groupcast ID of the RX UE itself. That is, the RX UE may start SL drx-InactivityTimer only when a 24-bit destination ID, which is a combination of a 16-bit destination ID included in the SCI and an 8-bit destination ID included in the MAC header, is the same as the own 24-bit groupcast destination ID.

Method 8. An RX UE may receive Sidelink Control Information (PSCCH) transmitted by a TX UE. For example, in case of broadcast transmission, when the RX UE receives SCI transmitted by the TX UE, the RX UE may start SL drx-InactivityTimer only when a layer 1 partial destination ID for a 24-bit broadcast ID included in the SCI matches a layer 1 partial destination ID for a 24-bit broadcast ID of the RX UE itself.

Method 9. An RX UE may receive Sidelink Control Information (PSCCH) transmitted by a TX UE. For example, in case of broadcast transmission, when the RX UE receives SCI transmitted by the TX UE, the RX UE may check the remaining address IDs included in the address field of a PSSCH's MAC header related to a PSCCH (SCI) only when a layer 1 partial destination ID for a 24-bit broadcast ID included in the SCI matches a layer 1 partial destination ID for a 24-bit broadcast ID of the RX UE itself. That is, an RX UE may start an SL drx-InactivityTimer only when a 24-bit Destination ID combining a 16-bit destination ID included in SCI and an 8-bit destination ID included in a MAC Header is the same as its 24-bit broadcast destination ID.

According to an embodiment of the present disclosure, when an Rx UE satisfies at least one of the following conditions with respect to when a new TB transmitted by a TX UE is received (e.g., PSSCH reception), a method for allowing RX UE to start SL drx-InactivityTimer is proposed. For example, while an SL drx-InactivityTimer is running, a UE may continue to perform SL communication (e.g., SL transmission and/or SL reception) by maintaining an active state.

Method 1. For example, for Unicast, Groupcast, and/or Broadcast, an RX UE may start an SL drx-InactivityTimer when receiving a PSSCH (e.g., SL data) transmitted by a TX UE.

Method 2. An RX UE may receive a PSSCH (SL data) transmitted by a TX UE. For example, in the case of unicast transmission, only when an RX UE receives a PSSCH transmitted by a TX UE, when a layer 1 partial destination ID included in SCI related to the received PSSCH matches a layer 1 partial source ID of the RX UE itself, and if it is confirmed that a layer 1 partial source ID included in the SCI is the same as a layer 1 partial source ID of the peer TX UE that has established a unicast connection with itself, the RX UE may check the address field of the PSSCH's MAC header. For example, a layer 1 partial source ID of the peer TX UE may be its own Unicast layer 1 partial destination ID. That is, an RX UE may start SL drx-InactivityTimer only when a 24-bit Destination ID, which is a combination of a 16-bit destination ID included in SCI and an 8-bit destination ID included in a MAC Header, is the same as its own 24-bit Source ID.

Method 3. An RX UE may receive a PSSCH (SL data) transmitted by a TX UE. For example, in the case of unicast transmission, only when an RX UE receives a PSSCH transmitted by a TX UE, when a layer 1 partial destination ID included in SCI related to the received PSSCH matches a layer 1 partial source ID of the RX UE itself, and when it is confirmed that a layer 1 partial source ID included in the SCI is the same as a layer 1 partial source ID of the peer TX UE that has established a unicast connection with itself, the RX UE may check the address field of the PSSCH's MAC header. For example, the layer 1 partial source ID of the peer TX UE may be a unicast layer 1 partial destination ID of the RX UE itself. That is, an RX UE may start SL drx-InactivityTimer only when a 24-bit Destination ID, which is a combination of a 16-bit destination ID included in SCI and an 8-bit destination ID included in a MAC Header, is the same as its 24-bit Source ID and when a 24-bit source ID, which is a combination of an 8-bit source ID included in the SCI and a 16-bit source ID included in the MAC header, matches a 24-bit unicast destination ID with which it has established a unicast connection.

Method 4. An RX UE may receive a PSSCH (SL data) transmitted by a TX UE. For example, for Groupcast transmission, when the RX UE receives the PSSCH transmitted by the TX UE, the RX UE may check the remaining address IDs included in the address field of the PSSCH's MAC header only if a layer 1 partial destination ID for a 24 bit groupcast ID included in SCI related to the received PSSCH matches a layer 1 partial destination ID for a 24 bit groupcast ID of the RX UE itself. That is, an RX UE may start SL drx-InactivityTimer only if a 24-bit destination ID that combines a 16-bit destination ID included in SCI and an 8-bit destination ID included in a MAC Header is the same as the own 24-bit groupcast destination ID.

Method 5. An RX UE may receive a PSSCH (SL data) transmitted by a TX UE. For example, In case of broadcast transmission), when the RX UE receives the PSSCH transmitted by the TX UE, the RX UE may check the remaining address IDs included in the address field of the PSSCH's MAC header only if a layer 1 partial destination ID for a 24-bit broadcast ID included in SCI related to the received PSSCH matches a layer 1 partial destination ID for a 24-bit broadcast ID of the RX UE itself. That is, an RX UE may start SL drx-InactivityTimer only when a 24-bit destination ID, which is a combination of a 16-bit destination ID included in SCI and an 8-bit destination ID included in a MAC Header, is the same as the own 24-bit broadcast destination ID.

According to an embodiment of the present disclosure, a TX UE may start a timer (e.g., SL DRX timer) when SL data transmission starts. And, with respect to HARQ feedback Disabled MAC PDU transmission (e.g., blind transmission), the TX UE may start a timer (e.g., SL DRX timer) when SL data transmission starts.

According to an embodiment of the present disclosure, in relation to HARQ Feedback Disabled MAC PDU transmission, when the following conditions are satisfied, a Uu DRX operation may be performed as follows. For example, a HARQ RTT timer, a timer, and/or active timer of the present disclosure may mean a timer for monitoring a base station signal for sidelink resource allocation mode 1 operation. For example, 1. When PUCCH is configured
   1) An HARQ RTT timer may be started when transmitting (both case of) SL HARQ ACK/NACK through PUCCH.
   2) an SL DRX-RetransmissionTimer may be started only when an SL HARQ NACK is transmitted through a PUCCH. And/or, an SL DRX-RetransmissionTimer may be started when a TX UE receives SL HARQ NACK from an RX UE through a PSFCH (i.e., HARQ Feedback Enabled MAC PDU).

2. When PUCCH is not configured
   TX UE may start a timer for mode 1 PDCCH monitoring when SL data transmission starts.

According to an embodiment of the present disclosure, if a TX UE misses a PSFCH monitoring, a Uu DRX operation may be performed as follows.

1. A TX UE may start an active timer for monitoring a retransmission grant of a base station, despite not being able to perform a PSFCH monitoring.
2. If a PUCCH is configured even though a TX UE failed to perform a PSFCH monitoring, the TX UE may transmit an SL HARQ NACK through the PUCCH and start an active timer for monitoring a retransmission grant of a base station.
3. If PUCCH is not configured even though a TX UE has failed to perform PSFCH monitoring, the TX UE may start an active timer for monitoring a retransmission grant of a base station from a point where PSFCH monitoring had to be performed.

According to an embodiment of the present disclosure, when an RX UE drops PSFCH transmission, an SL DRX operation may be performed as follows.

1. HARQ Feedback Enabled MAC PDU
   1) When an RX UE successfully receives SL data (that is, upon successful decoding), since the TX UE may misjudgment as decoding failure even though a PSFCH has not actually been transmitted, the RX UE may start an active timer to monitor a retransmission packet of the TX UE.
   2) When an RX UE fails to receive SL data (i.e., when decoding fails), even if a PSFCH has not actually been transmitted, the RX UE may start an active timer to monitor a retransmission packet of a TX UE.

According to an embodiment of the present disclosure, in case of HARQ Feedback Disabled MAC PDU, an SL DRX operation of an RX UE may be performed as follows.

1. When receiving SL data, an RX UE may start an active timer to monitor the next HARQ Disabled MAC PDU (e.g., blind transmission) transmitted by a TX UE in both decoding success/failure cases.

Figure 12:
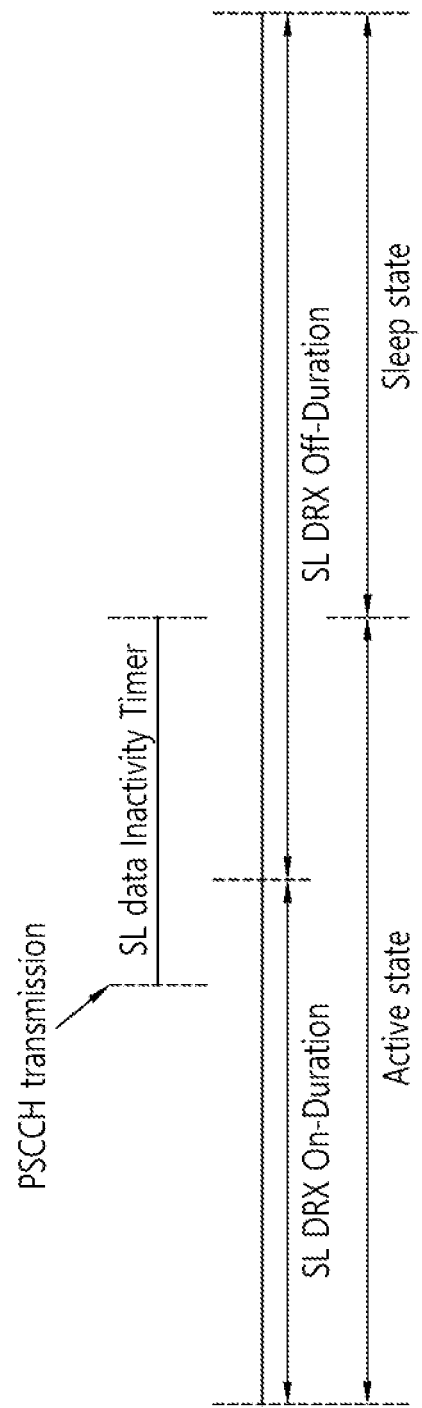
FIG. 12 shows extending an SL on-duration period by starting an SL dataInactivity timer when a TX UE transmits a PSCCH according to an embodiment of the present disclosure.

FIG. 12 shows extending an SL on-duration period by starting an SL dataInactivity timer when a TX UE transmits a PSCCH according to an embodiment of the present disclosure. The embodiment of FIG. 12 may be combined with various embodiments of the present disclosure.

Referring to FIG. 12, an embodiment of a power saving operation when a TX UE transmits a PSCCH is shown. For example, based on a transmission of a PSCCH, an SL dataInactivity timer may be started. While the SL dataInactivity timer is operating, the TX UE may be in an active state even if the SL DRX on-duration expires. For example, when the SL dataInactivity timer expires in SL DRX off-duration, the TX UE may enter a sleep state.

Figure 13:
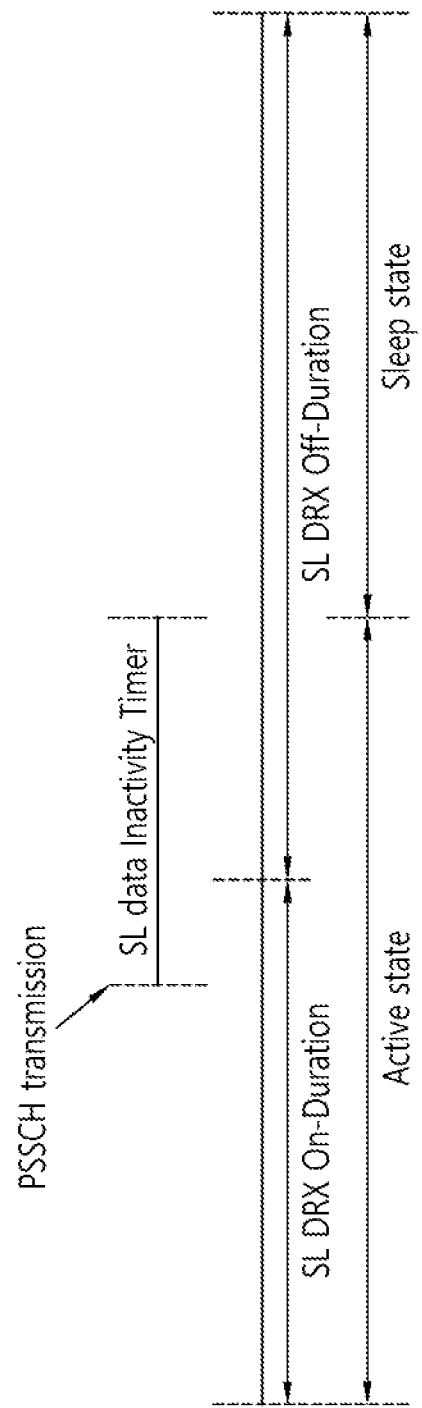
FIG. 13 shows that an SL on-duration period is extended by starting an SL dataInactivity timer when a TX UE transmits a PSSCH, according to an embodiment of present disclosure.

FIG. 13 shows that an SL on-duration period is extended by starting an SL dataInactivity timer when a TX UE transmits a PSSCH, according to an embodiment of present disclosure. The embodiment of FIG. 13 may be combined with various embodiments of the present disclosure.

Referring to FIG. 13, an embodiment of a power saving operation when a TX UE transmits a PSSCH is shown. For example, based on a transmission of a PSSCH, an SL dataInactivity timer may be started. While the SL dataInactivity timer is operating, the TX UE may be in an active state even if the SL DRX on-duration expires. For example, when the SL dataInactivity timer expires in SL DRX off-duration, the TX UE may enter a sleep state.

Figure 14:
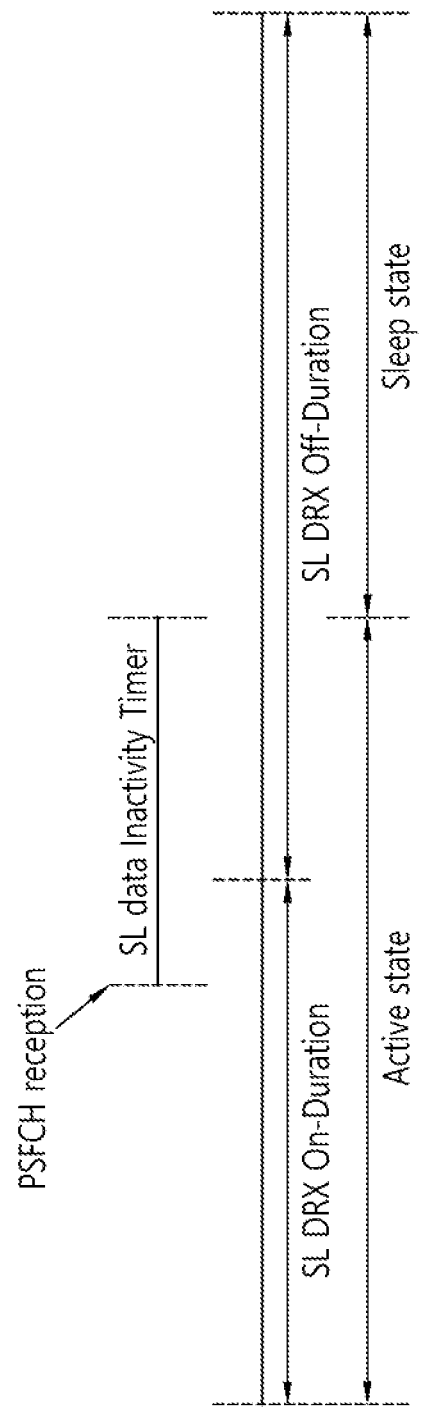
FIG. 14 shows extending an SL on-duration period by starting an SL dataInactivity timer when a TX UE receives a PSFCH, according to an embodiment of present disclosure.

FIG. 14 shows extending an SL on-duration period by starting an SL dataInactivity timer when a TX UE receives a PSFCH, according to an embodiment of present disclosure. The embodiment of FIG. 14 may be combined with various embodiments of the present disclosure.

Referring to FIG. 14, an embodiment of a power saving operation when a TX UE receives a PSFCH is shown. For example, based on a reception of a PSFCH, an SL dataInactivity timer may be started. While the SL dataInactivity timer is operating, the TX UE may be in an active state even if the SL DRX on-duration expires. For example, when the SL dataInactivity timer expires in SL DRX off-duration, the TX UE may enter a sleep state.

Figure 15:
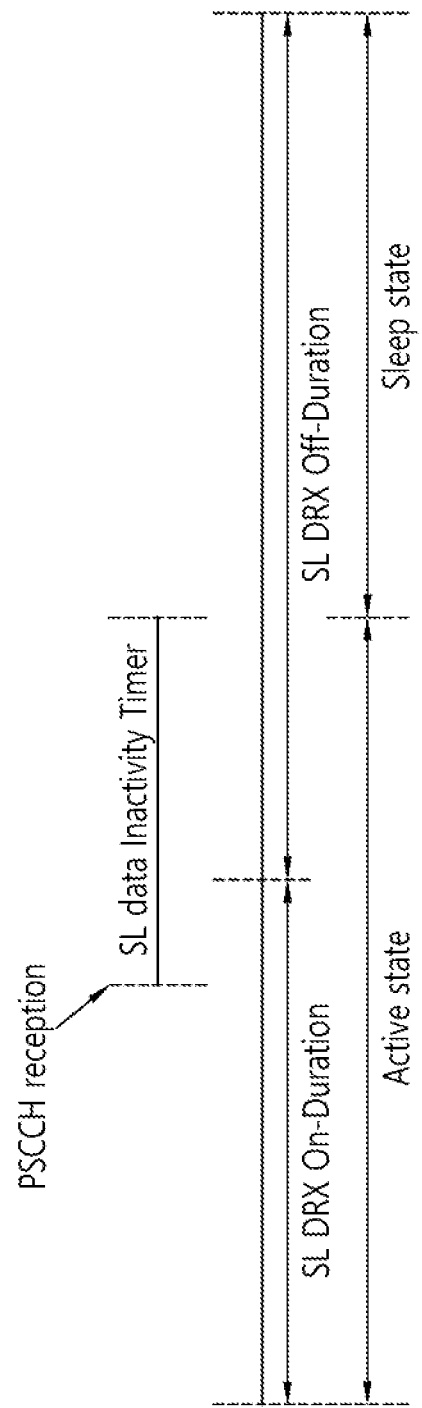
FIG. 15 shows that an SL on-duration period is extended by starting an SL dataInactivity timer when an RX UE receives a PSCCH, according to an embodiment of present disclosure.

FIG. 15 shows that an SL on-duration period is extended by starting an SL dataInactivity timer when an RX UE receives a PSCCH, according to an embodiment of present disclosure. The embodiment of FIG. 15 may be combined with various embodiments of the present disclosure.

Referring to FIG. 15, an embodiment of the power saving operation when an RX UE receives a PSCCH is shown. For example, based on a reception of a PSCCH, an SL dataInactivity timer may be started. While the SL dataInactivity timer is running, the RX UE may be in an active state even when an SL DRX on-duration expires. For example, when the SL dataInactivity timer expires in SL DRX off-duration, the RX UE may enter a sleep state.

Figure 16:
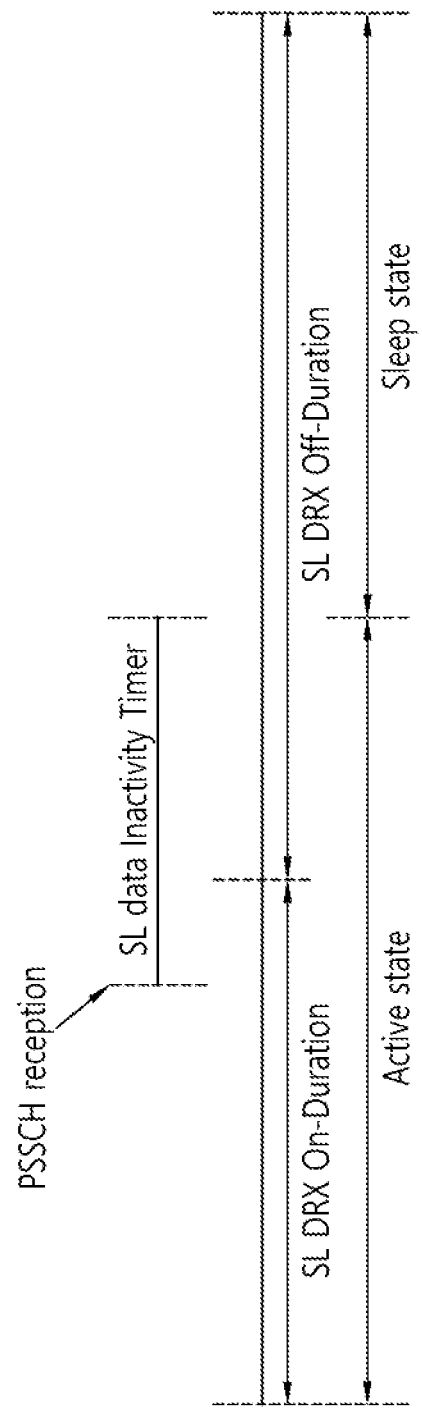
FIG. 16 shows that an SL on-duration period is extended by starting an SL dataInactivity timer when an RX UE receives a PSSCH, according to an embodiment of present disclosure.

FIG. 16 shows that an SL on-duration period is extended by starting an SL dataInactivity timer when an RX UE receives a PSSCH, according to an embodiment of present disclosure. The embodiment of FIG. 16 may be combined with various embodiments of the present disclosure.

Referring to FIG. 16, an embodiment of a power saving operation when an RX UE receives a PSSCH is shown. For example, based on a reception of a PSSCH, SL dataInactivity timer may be started. While the SL dataInactivity timer is running, the RX UE may be in an active state even when an SL DRX on-duration expires. For example, when the SL dataInactivity timer expires in SL DRX off-duration, the RX UE may enter a sleep state.

Figure 17:
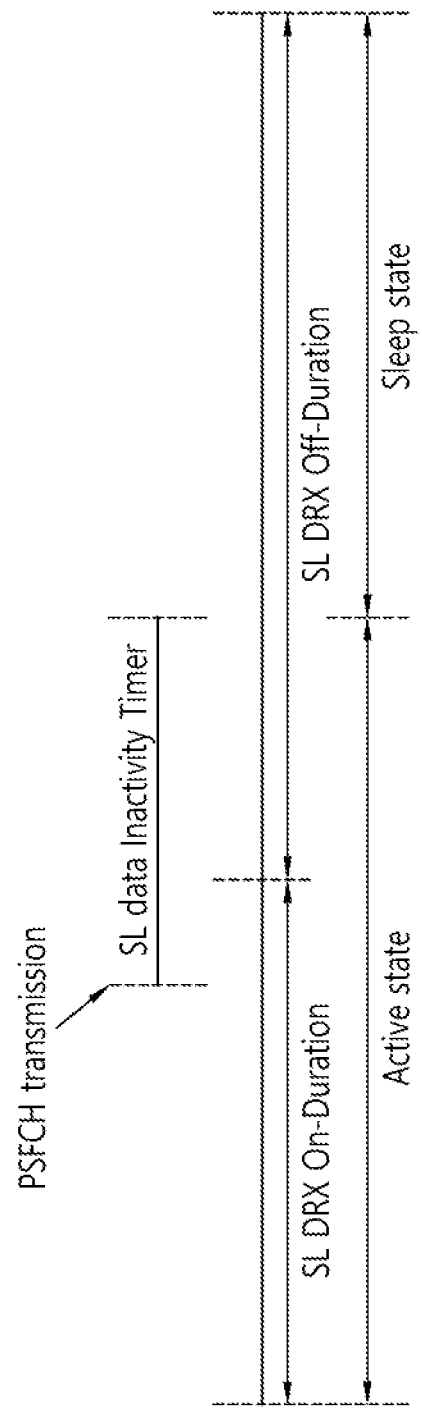
FIG. 17 shows that an SL on-duration period is extended by starting an SL dataInactivity timer when an RX UE transmits a PSFCH, according to an embodiment of present disclosure.

FIG. 17 shows that an SL on-duration period is extended by starting an SL dataInactivity timer when an RX UE transmits a PSFCH, according to an embodiment of present disclosure. The embodiment of FIG. 17 may be combined with various embodiments of the present disclosure.

Referring to FIG. 17, an embodiment of a power saving operation when an RX UE transmits a PSFCH is shown. For example, based on a transmission of a PSFCH, an SL dataInactivity timer may be started. While the SL dataInactivity timer is running, the RX UE may be in an active state even when an SL DRX on-duration expires. For example, when the SL dataInactivity timer expires in SL DRX off-duration, the RX UE may enter a sleep state.

According to an embodiment of the present disclosure, each UE operating in SL DRX may continue to perform SL transmission by remaining in an active state without transitioning to a sleep state, even if their SL drx on-duration period or active time has expired, if the condition for SL data transmission/reception is satisfied. Through this, frequent switching between a sleep state and an active state of a UE may not be induced.

According to various embodiments of the present disclosure, an SL dataInactivity timer may mean or replaced with an SL DRX timer that allows a UE operating an SL drx-InactivityTimer or an SL DRX Active timer, or an SL DRX to perform an active time operation.

According to an embodiment of the present disclosure, a method for operating in an active state (a period capable of sensing/transmitting/receiving a sidelink signal), when at least one of the following conditions is satisfied, for a certain time, even if the current SL DRX time of a UE (TX UE and/or RX UE) is SL DRX off-duration (e.g., a period in which a sidelink signal is not sensed/monitor/received/transmitted) is proposed. For example, a certain time for operating in an active state may be a predefined time. For example, a certain time for operating in an active state may be a time during which a predefined timer runs. For example, a certain time for operating in the active state may be a time during which the SL DRX-RTTtimer operates. For example, the SL DRX-RTTtimer may indicate a time for which a sidelink retransmission resource of a UE (TX UE and/or RX UE) is prepared, or a minimum time for which sidelink retransmission is expected. For example, a UE may operate in a sleep state in the expectation that sidelink retransmission will not be transmitted from a counterpart UE before the SL DRX-RTTtimer expires. For example, the certain time for operating in the active state may be a time for an SL DRX-RetransmissionTimer to run. An SL DRX-RetransmissionTimer may indicate a time for a UE (TX UE and/or RX UE) to monitor a sidelink retransmission packet transmitted by a counterpart UE, or a time for retransmission using a sidelink retransmission resource. For example, the certain time that can operate in an active state may represent a time that a timer operates, which is defined so that a UE (TX UE and/or RX UE) operates in an active state for as long as the timer operates in an SL DRX off-duration period.

1. When an SL congestion level is above a certain threshold

2. When SL TX data with SidelinkPriority greater than or equal to a threshold is buffered in a buffer of a TX UE in SL DRX off-duration 3. When a TX UE receives more than a threshold PSFCH (e.g., SL HARQ NACK) for a PSCCH/PSSCH transmitted by the TX UE from an RX UE 4. When an SL DTX for a PSCCH/PSSCH transmitted by a TX UE to an RX UE occurs above a threshold. For example, the SL DTX may include a case in which the TX UE does not receive an SL HARQ ACK/NACK or fails to monitor a PSFCH.

5. With respect to the maximum number of transmissions of 1 TB transmitted by a TX UE, the remaining number of transmissions of the 1 TB does not remain more than a threshold. That is, when the number of transmissions remaining until the maximum number of transmissions of 1 TB is not much.

For example, the following SL DRX timer mentioned in this disclosure may be used for the following purposes.

1. SL DRX on-duration timer

A period in which a UE performing an SL DRX operation should basically operate in an active state for PSCCH/PSSCH reception of a counterpart UE 2. SL DRX inactivity timer A duration extending an SL DRX on-duration period, which is a period in which a UE performing an SL DRX operation basically needs to operate in an active state to receive a PSCCH/PSSCH of a counterpart UE. That is, an SL DRX on-duration timer may be extended as much as the period during which an SL DRX inactivity timer is operating. Also, when a UE receives a new packet (e.g., a new PSSCH) from a counterpart UE, an SL DRX inactivity timer may be started, thereby extending an SL DRX on-duration timer.

3. SL DRX HARQ RTT timer

A period in which a UE performing an SL DRX operation operates in a sleep state until it receives a retransmission packet (or PSSCH assignment) transmitted from a counterpart UE. That is, when a UE starts an SL DRX HARQ RTT timer, the UE determines that a counterpart UE will not transmit a sidelink retransmission packet to itself until the SL DRX HARQ RTT timer expires, and operates in a sleep state while the corresponding timer operates.

4. SL DRX retransmission timer

A period in which a UE performing SL DRX operation operates in an active state to receive a retransmission packet (or PSSCH assignment) transmitted from a counterpart UE. During the corresponding timer period, a UE monitors to receive a retransmission sidelink packet (or PSSCH assignment) transmitted by a counterpart UE.

In the description of the present disclosure, the name of the timer (Uu DRX HARQ RTT Timer, Uu DRX retransmission timer, SL DRX on-duration timer, SL DRX inactivity timer, SL DRX HARQ RTT timer, SL DRX retransmission timer, etc.) is exemplary, a timer performing the same/similar function based on the contents described in each timer may be regarded as the same/similar timer regardless of its name.

The proposal of the present disclosure can be applied and extended as a method for solving the problem of loss due to interruption occurring during Uu Bandwidth Part (BWP) switching.

For example, the proposal of the present disclosure can be applied and extended as a method of solving the problem of loss due to interruption occurring during SL BWP switching when a UE supports SL Multiple Bandwidth Part (BWP).

The proposal of the present disclosure may be extended and applied to parameters (and/or timers) included in a UE-Pair Specific SL DRX configuration, a UE-Pair Specific SL DRX pattern, or a UE-Pair Specific SL DRX configuration, in addition to parameters (and/or timers) included in default/common SL DRX configuration or default/common SL DRX pattern or default/common SL DRX configuration. In addition, on-duration term mentioned in the proposal of the present disclosure can be extended to an active state period (a state that wakes up and operates to receive/transmit wireless signals. For example, a state of an RF module may be "On".). The term off-duration can be extended and interpreted as a sleep time period (a period that operates in a sleep mode to save power. For example, a state of an RF module may be "Off". For example, even in a sleep time period, it may not mean that a TX UE must operate in a compulsory sleep mode. For example, if necessary, it may be allowed to temporarily operate in an active state to perform a sensing operation/transmission operation even during sleep time.). In addition, "whether to apply the (some) proposed method/rule of the present disclosure and/or related parameters (e.g., threshold) may be configured specifically (or differently or independently) according to a resource pool, a congestion level, service priority (and/or type), QoS requirements (e.g., latency and/or reliability) or PQI, traffic type (e.g., (non-) periodic generation), SL transmission resource allocation mode (e.g., mode 1 or mode 2), etc.

For example, whether the proposed rule of the present disclosure is applied (and/or related parameter configuration value) may be configured specifically (and/or independently, and/or differently) for at least one of a resource pool, a service/packet type (and/or a priority), QoS requirements (e.g., URLLC/EMBB Traffic, Reliability, Latency), PQI, cast type (e.g., unicast, groupcast, broadcast), a (resource pool) congestion level (e.g., CBR), SL HARQ feedback scheme (e.g., NACK Only feedback, ACK/NACK feedback), when transmitting HARQ feedback Enabled MAC PDU (and/or HARQ feedback Disabled MAC PDU), whether to configure PUCCH-based SL HARQ feedback reporting operation, when performing pre-emption (and/or re-evaluation) (or, pre-emption-based resource) reselection), (L2 or L1) (source and/or destination) identifier, (L2 or L1) (combination of source layer ID and destination layer ID) identifier, (L2 or L1) (a combination of a pair of source layer ID and destination layer ID and a cast type) identifier, a direction of a pair of a source layer ID and a destination layer ID, PC5 RRC connection/link, when performing SL DRX, SL Mode type (resource allocation mode 1 or resource allocation mode 2), (non) periodic resource reservation.

For example, the term "certain time" mentioned in the proposal of the present disclosure refers to a time during which a UE operates as active time for a predefined time to receive a sidelink signal or sidelink data from a counterpart UE, or a time that operates as an active time for a specific timer (For example, SL DRX Retransmission Timer, SL DRX Inactivity Timer, or a timer that guarantees to operate in active time in DRX operation of RX UE) time.

In this disclosure, active time may mean a time during which a UE operates or can operate in an active state. For example, a sleep time may mean a time during which a UE operates or can operate in a sleep state.

Also, for example, whether to apply the rule according to the proposal and the proposal of the present disclosure (and/or the configuration value of the related parameter) may be applied to the mmWave SL operation.

Various embodiments of the present disclosure may be combined with a transmission/reception operation through a BWP of a UE and/or an SL HARQ feedback operation of a UE.

Figure 18:
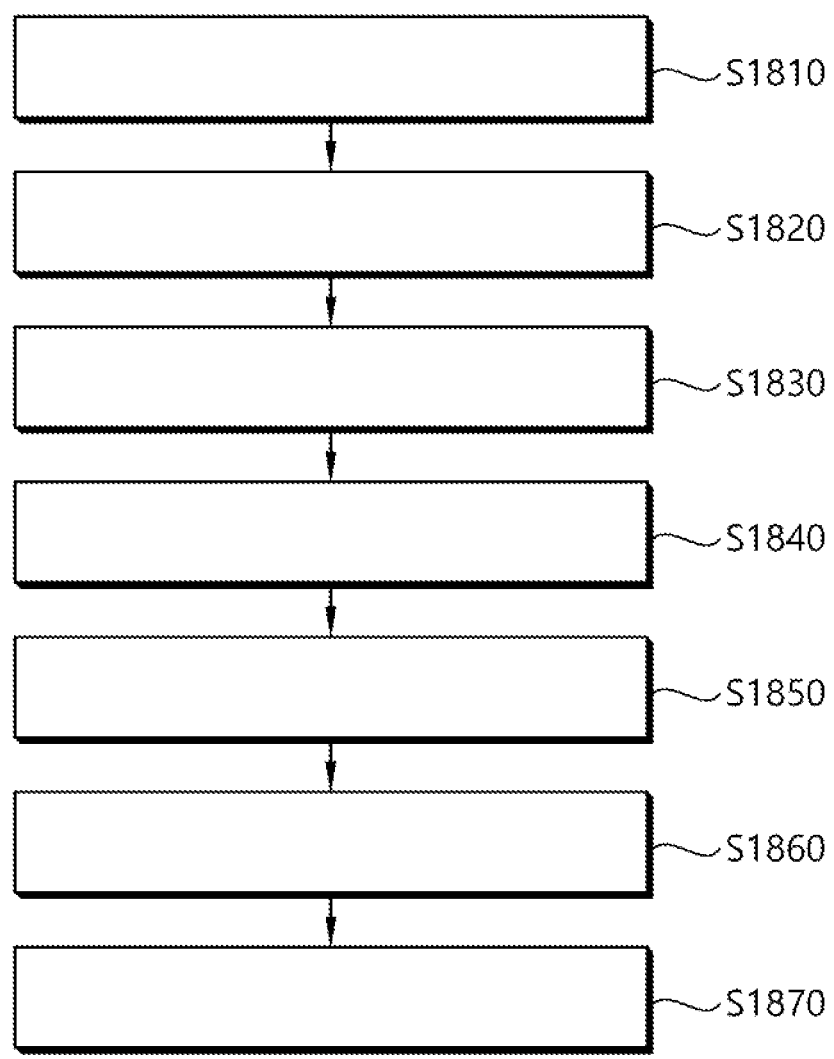
FIG. 18 shows a procedure in which a first device performs sidelink communication with a second device based on a second timer according to an embodiment of the present disclosure.

FIG. 18 shows a procedure in which a first device performs sidelink communication with a second device based on a second timer according to an embodiment of the present disclosure. The embodiment of FIG. 18 may be combined with various embodiments of the present disclosure.

Referring to FIG. 18, in step S1810, a first device may start a first timer related to an on-duration. In step S1820, the first device may receive first sidelink control information (SCI) for scheduling of second SCI, from a second device, through a physical sidelink control channel (PSCCH). In step S1830, the first device may receive the second SCI including a 16-bit first destination identifier (ID) and a medium access control (MAC) header including an 8-bit second destination ID, from the second device, through a physical sidelink shared channel (PSSCH). In step S1840, the first device may obtain a third destination ID based on the first destination ID and the second destination ID. In step S1850, the first device may compare the third destination ID and a 24-bit first source ID of the first device. In step S1860, the first device may start a second timer based on the first source ID which is same with the third destination ID. In step S1870, the first device may perform sidelink communication with the second device, based on the running second timer.

For example, additionally, the first device may compare the first destination ID and a 16-bit second source ID, wherein the second source ID may be included in the first source ID; and compare an 8-bit third source ID and an 8-bit fourth destination ID of the first device, wherein the third source ID may be included I the second SCI, wherein the first source ID and the third destination ID are compared based on: the second source ID which is same with the first destination ID; and the fourth destination ID which is same with the third source ID.

For example, additionally, the first device may obtain a fifth source ID based on an 8-bit third source ID and a 16-bit fourth source ID, wherein the third source ID may be included in the second SCI, wherein the fourth source ID may be included in the PSSCH; and compare the fifth source ID and a 24-bit fifth destination ID of the first device, wherein the second timer may be started based on the fifth destination ID which is same with the fifth source ID.

For example, the sidelink communication may be performed in the on-duration.

For example, the on-duration may be a period in which at least one of the first timer or the second timer is running.

For example, the sidelink communication may be not performed in an off-duration, and the off-duration may be a period in which the first timer and the second timer are not running.

For example, additionally, the first device may transmit a physical sidelink feedback channel (PSFCH) related to the PSCCH or the PSSCH to the second device, wherein the second timer may be started based on the transmission of the PSFCH.

For example, additionally, the first device may transmit an uplink data to a base station, wherein a PSFCH related to the PSCCH or the PSSCH may be not transmitted to the second device, based on the uplink data being transmitted to the base station.

For example, additionally, the first device may compare priorities of the transmission of the PSFCH and the transmission of the uplink data, wherein the uplink data may be transmitted based on the priority of the transmission of the uplink data which is higher than the priority of the transmission of the PSFCH, and wherein the second timer may be started based on the PSFCH being not transmitted to the second device.

For example, additionally, the first device may transmit an LTE data to the second device, wherein an NR data may be not transmitted to the second device, based on the LTE data being transmitted to the second device.

For example, additionally, the first device may compare priorities of the transmission of the LTE data and the transmission of the NR data, wherein the LTE data may be transmitted based on the priority of the LTE data which is higher than the priority of the transmission of the NR data, and wherein the second timer may be started based on the NR data being not transmitted to the second device.

For example, the second timer may be started, further based on a congestion level related to the sidelink communication, which is equal to or higher than a threshold value.

For example, the sidelink communication may be one among unicast, groupcast, or broadcast.

The above-described embodiment may be applied to various devices to be described below. For example, a processor 102 of a first device 100 may start a first timer related to an on-duration. And, the processor 102 of the first device 100 may control a transceiver 106 to receive first sidelink control information (SCI) for scheduling of second SCI, from a second device 200, through a physical sidelink control channel (PSCCH). And, the processor 102 of the first device 100 may control the transceiver 106 to receive the second SCI including a 16-bit first destination identifier (ID) and a medium access control (MAC) header including an 8-bit second destination ID, from the second device 200, through a physical sidelink shared channel (PSSCH). And, the processor 102 of the first device 100 may obtain a third destination ID based on the first destination ID and the second destination ID. And, the processor 102 of the first device 100 may compare the third destination ID and a 24-bit first source ID of the first device 100. And, the processor 102 of the first device 100 may start a second timer based on the first source ID which is same with the third destination ID. And, the processor 102 of the first device 100 may control the transceiver 106 to perform sidelink communication with the second device 200, based on the running second timer.

According to an embodiment of the present disclosure, a first device for performing wireless communication may be proposed. For example, the first device may comprise: one or more memories storing instructions; one or more transceivers; and one or more processors connected to the one or more memories and the one or more transceivers, wherein the one or more processors execute the instructions to: start a first timer related to an on-duration; receive first sidelink control information (SCI) for scheduling of second SCI, from a second device, through a physical sidelink control channel (PSCCH); receive the second SCI including a 16-bit first destination identifier (ID) and a medium access control (MAC) header including an 8-bit second destination ID, from the second device, through a physical sidelink shared channel (PSSCH); obtain a third destination ID based on the first destination ID and the second destination ID; compare the third destination ID and a 24-bit first source ID of the first device; start a second timer based on the first source ID which is same with the third destination ID; and perform sidelink communication with the second device, based on the running second timer.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: start a first timer related to an on-duration; receive first sidelink control information (SCI) for scheduling of second SCI, from a second UE, through a physical sidelink control channel (PSCCH); receive the second SCI including a 16-bit first destination identifier (ID) and a medium access control (MAC) header including an 8-bit second destination ID, from the second UE, through a physical sidelink shared channel (PSSCH); obtain a third destination ID based on the first destination ID and the second destination ID; compare the third destination ID and a 24-bit first source ID of the first UE; start a second timer based on the first source ID which is same with the third destination ID; and perform sidelink communication with the second UE, based on the running second timer.

According to an embodiment of the present disclosure, a non-transitory computer-readable storage medium storing instructions may be proposed. For example, the instructions, when executed, may cause a first device to: start a first timer related to an on-duration; receive first sidelink control information (SCI) for scheduling of second SCI, from a second device, through a physical sidelink control channel (PSCCH); receive the second SCI including a 16-bit first destination identifier (ID) and a medium access control (MAC) header including an 8-bit second destination ID, from the second device, through a physical sidelink shared channel (PSSCH); obtain a third destination ID based on the first destination ID and the second destination ID; compare the third destination ID and a 24-bit first source ID of the first device; start a second timer based on the first source ID which is same with the third destination ID; and perform sidelink communication with the second device, based on the running second timer.

Figure 19:
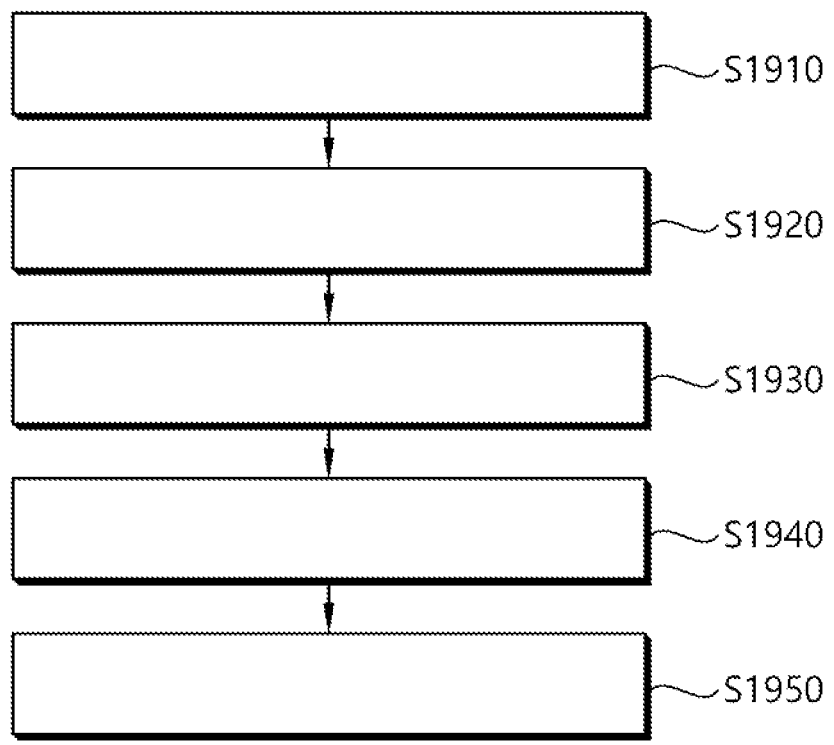
FIG. 19 shows a procedure in which a second device performs sidelink communication with a first device based on a second timer according to an embodiment of the present disclosure.

FIG. 19 shows a procedure in which a second device performs sidelink communication with a first device based on a second timer according to an embodiment of the present disclosure. The embodiment of FIG. 19 may be combined with various embodiments of the present disclosure.

Referring to FIG. 19, in step S1910, a second device may start a first timer related to an on-duration. In step S1920, the second device may transmit first sidelink control information (SCI) for scheduling of second SCI, to a first device, through a physical sidelink control channel (PSCCH). In step S1930, the second device may transmit the second SCI including a 16-bit first destination identifier (ID), to the first device, through a physical sidelink shared channel (PSSCH). In step S1940, the second device may start a second timer, based on the transmission of the PSCCH or the transmission of the PSSCH. In step S1950, the second device may perform sidelink communication with the first device, based on the running second timer.

For example, additionally, the second device may receive a physical sidelink feedback channel (PSFCH) related to the PSCCH or the PSSCH from the first device, wherein the PSFCH may include a hybrid automatic repeat request (HARQ) negative acknowledge (NACK); and stop the second timer, based on the HARQ NACK received by a threshold value.

The above-described embodiment may be applied to various devices to be described below. For example, a processor 202 of a second device 200 may start a first timer related to an on-duration. And, the processor 202 of the second device 200 may control a transceiver 206 to transmit first sidelink control information (SCI) for scheduling of second SCI, to a first device 100, through a physical sidelink control channel (PSCCH). And, the processor 202 of the second device 200 may control the transceiver 206 to transmit the second SCI including a 16-bit first destination identifier (ID), to the first device 100, through a physical sidelink shared channel (PSSCH). And, the processor 202 of the second device 200 may start a second timer, based on the transmission of the PSCCH or the transmission of the PSSCH. And, the processor 202 of the second device 200 may control the transceiver 206 to perform sidelink communication with the first device 100, based on the running second timer.

According to an embodiment of the present disclosure, a second device for performing wireless communication may be proposed. For example, the second device may comprise: one or more memories storing instructions; one or more transceivers; and one or more processors connected to the one or more memories and the one or more transceivers, wherein the one or more processors execute the instructions to: start a first timer related to an on-duration; transmit first sidelink control information (SCI) for scheduling of second SCI, to a first device, through a physical sidelink control channel (PSCCH); transmit the second SCI including a 16-bit first destination identifier (ID), to the second device, through a physical sidelink shared channel (PSSCH); start a second timer, based on the transmission of the PSCCH or the transmission of the PSSCH; and perform sidelink communication with the first device, based on the running second timer.

For example, the one or more processors may further execute the instructions to: receive a physical sidelink feedback channel (PSFCH) related to the PSCCH or the PSSCH from the first device, wherein the PSFCH may include a hybrid automatic repeat request (HARQ) negative acknowledge (NACK); and stop the second timer, based on the HARQ NACK received by a threshold value.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
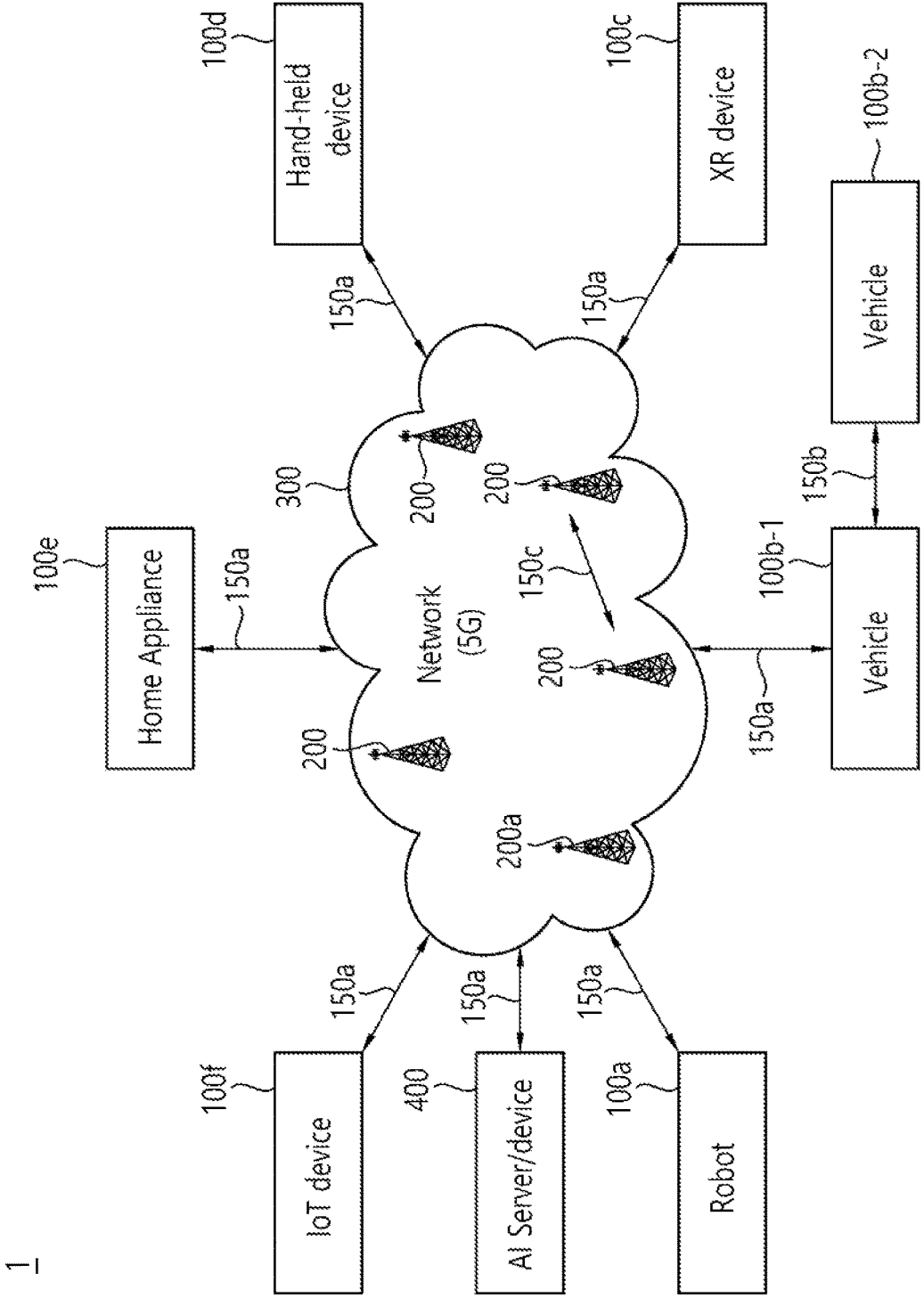
FIG. 20 shows a communication system 1, in accordance with an embodiment of the present disclosure.

FIG. 20 shows a communication system 1, in accordance with an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100$a$, vehicles 100$b$-1 and 100$b$-2, an eXtended Reality (XR) device 100$c$, a hand-held device 100$d$, a home appliance 100$e$, an Internet of Things (IoT) device 100$f$, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200$a$ may operate as a BS/network node with respect to other wireless devices.

Here, wireless communication technology implemented in wireless devices 100$a$ to 100$f$ of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100$a$ to 100$f$ of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
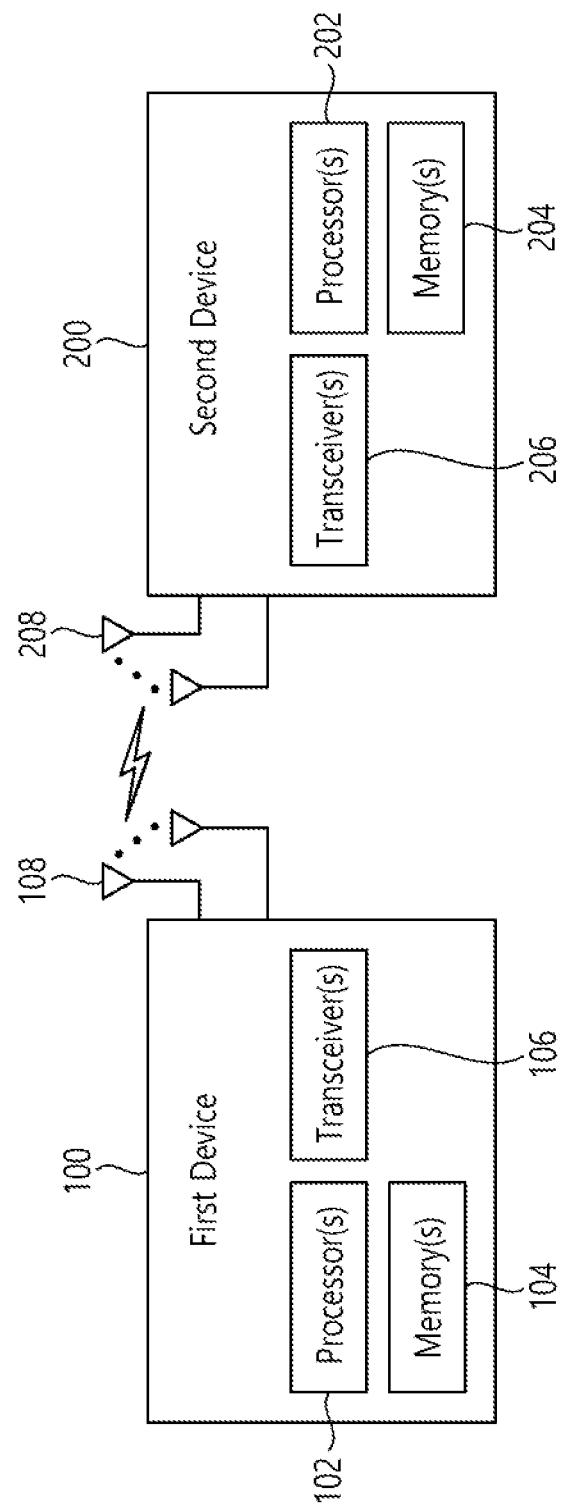
FIG. 21 shows wireless devices, in accordance with an embodiment of the present disclosure.

FIG. 21 shows wireless devices, in accordance with an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
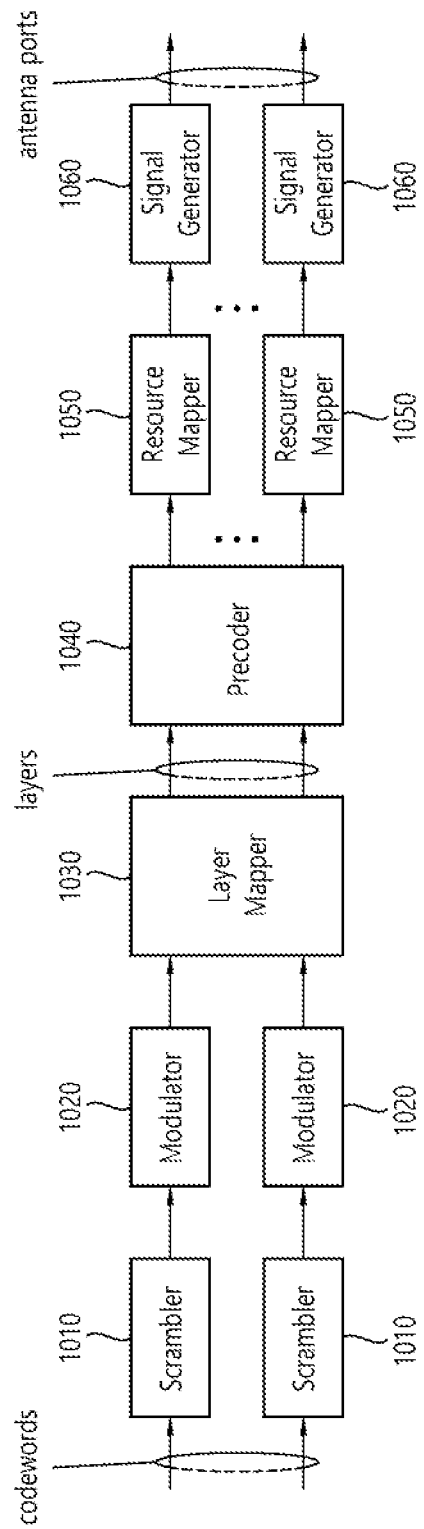
FIG. 22 shows a signal process circuit for a transmission signal, in accordance with an embodiment of the present disclosure.

FIG. 22 shows a signal process circuit for a transmission signal, in accordance with an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
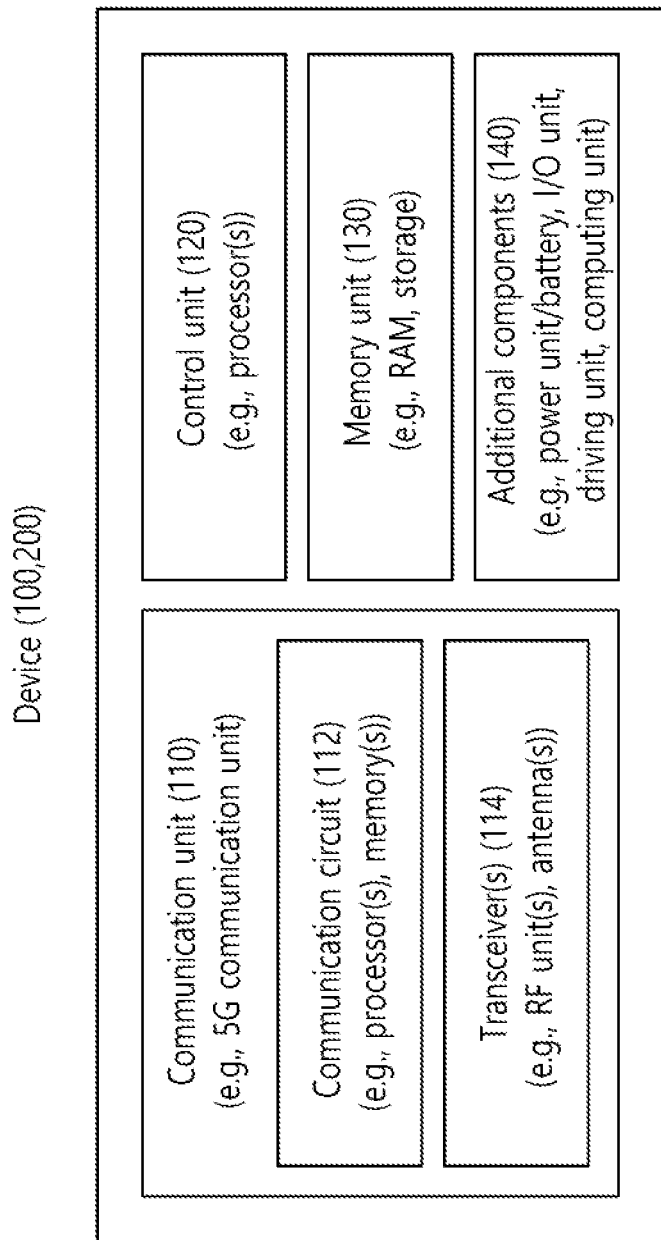
FIG. 23 shows a wireless device, in accordance with an embodiment of the present disclosure.

FIG. 23 shows another example of a wireless device, in accordance with an embodiment of the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
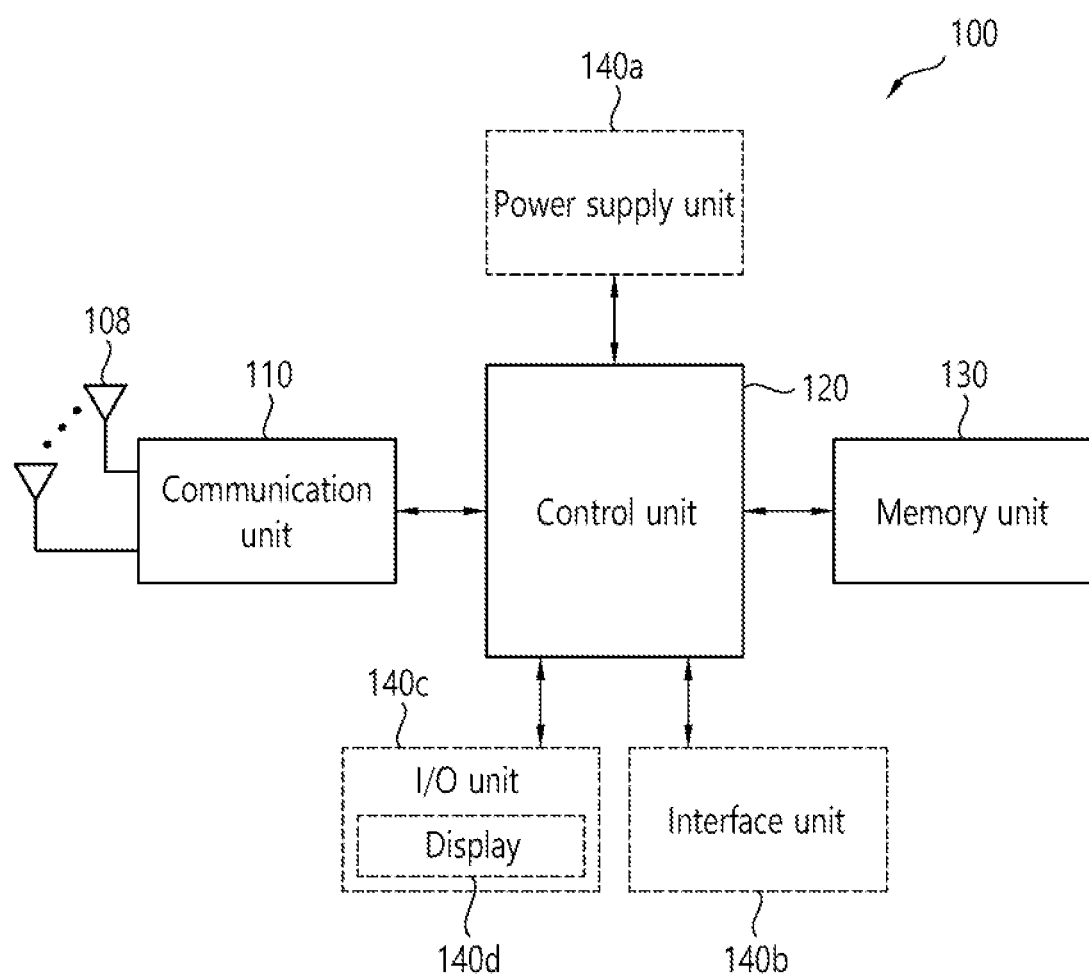
FIG. 24 shows a hand-held device, in accordance with an embodiment of the present disclosure.

FIG. 24 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 25:
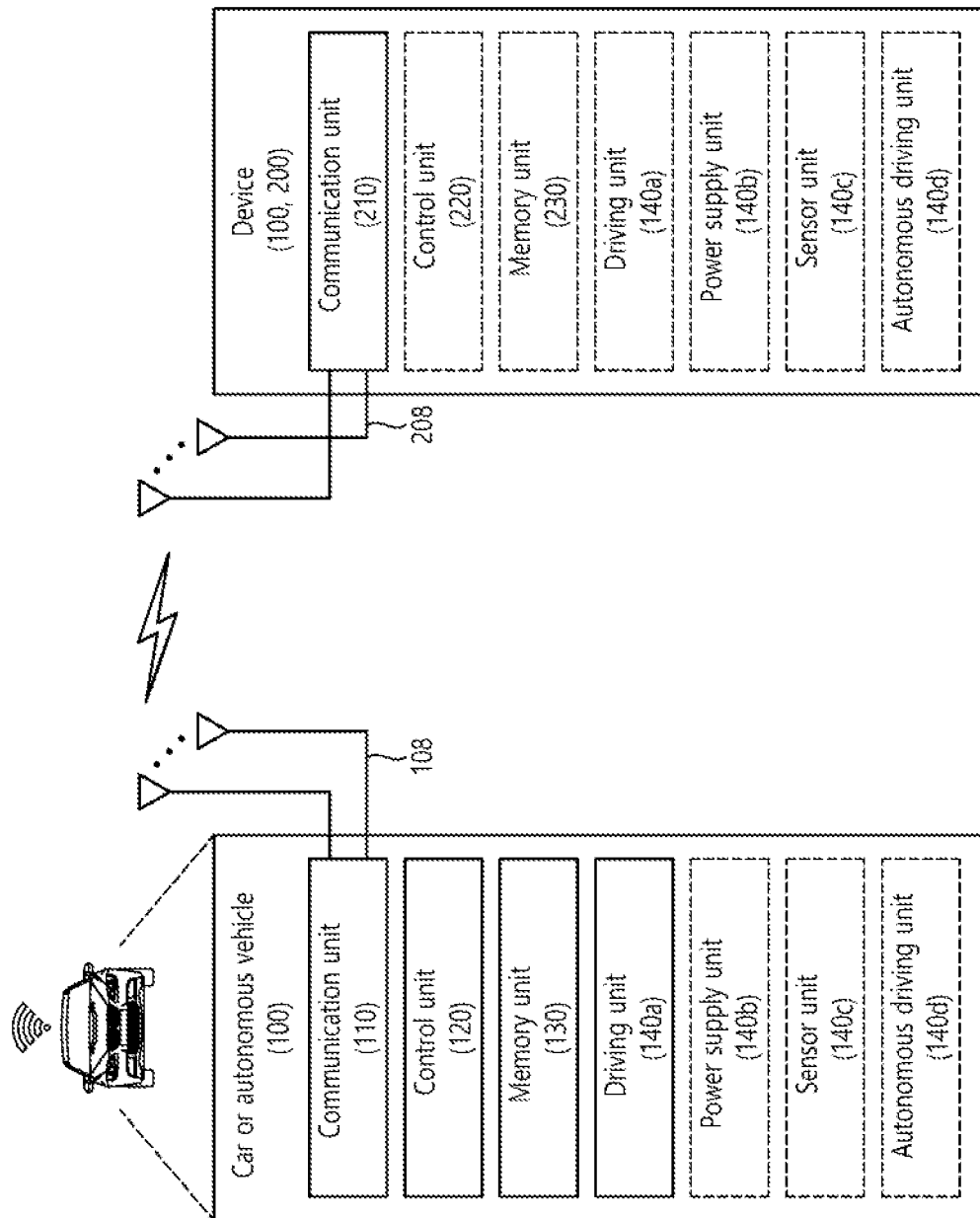
FIG. 25 shows a car or an autonomous vehicle, in accordance with an embodiment of the present disclosure.

FIG. 25 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
   obtaining sidelink (SL) discontinuous reception (DRX) configuration;
   starting an SL DRX on-duration timer of the SL DRX configuration;
   receiving first sidelink control information (SCI) for scheduling of a physical sidelink shared channel (PSSCH), from a second device, through a physical sidelink control channel (PSCCH);
   receiving a medium access control (MAC) protocol data unit (PDU) and second SCI including a 16-bit layer (L)1 destination identifier (ID) and an 8-bit L1 source ID, from the second device, through the PSSCH;
   comparing the L1 destination ID and a 16 least significant bit (LSB) of an L2 source ID of the first device;
   comparing the L1 source ID and an 8 LSB of an L2 destination ID of the first device; and
   starting an SL DRX inactivity timer of the SL DRX configuration, based on the L1 destination ID beingis the same as the 16 LSB of the L2 source ID, and the L1 source ID being the same as the 8 LSB of the L2 destination ID.

2. The method of claim 1, wherein an active time is a time during which a timer related to an active time of the SL DRX configuration is running, and wherein the timer related to an active timer of the SL DRX configuration includes the SL DRX on-duration timer and the SL DRX inactivity timer.

3. The method of claim 1, wherein the sidelink communication is not performed in an off-duration, and
wherein the off-duration is a period during which a timer related to an active time is not running.

4. The method of claim 1, wherein the SL DRX configuration includes a timer value related to the SL DRX inactivity timer, and the SL DRX inactivity timer runs by the timer value.

5. The method of claim 1, further comprising:
transmitting HARQ feedback related to the PSSCH through a physical sidelink feedback channel (PSFCH) to the second device; and
restarting the SL DRX inactivity timer, based on the transmission of the HARQ feedback.

6. The method of claim 1, further comprising:
transmitting an uplink data to a base station,
wherein HARQ feedback related to the PSSCH is not transmitted to the second device, based on the uplink data being transmitted to the base station.

7. The method of claim 6, further comprising:
comparing priorities of the transmission of the HARQ feedback and the transmission of the uplink data; and
restarting the SL DRX inactivity timer, based on the HARQ feedback being not transmitted to the second device,
wherein the uplink data is transmitted based on the priority of the transmission of the uplink data being higher than the priority of the transmission of the HARQ feedback, and
wherein the HARQ feedback is not transmitted, based on the priority of the transmission of the uplink data being higher than the priority of the transmission of the HARQ feedback.

8. The method of claim 1, further comprising:
transmitting an LTE data to the second device,
wherein an NR data is not transmitted to the second device, based on the LTE data being transmitted to the second device.

9. The method of claim 8, further comprising:
comparing priorities of the transmission of the LTE data and the transmission of the NR data; and
restarting the SL DRX inactivity timer further based on the NR data being not transmitted to the second device,
wherein the LTE data is transmitted based on the priority of the LTE data being higher than the priority of the transmission of the NR data, and
wherein the NR data is not transmitted based on the priority of the LTE data being higher than the priority of the transmission of the NR data.

10. The method of claim 1, wherein the SL DRX inactivity timer is restarted, based on a congestion level related to the sidelink communication, which is equal to or higher than a threshold value.

11. The method of claim 1, wherein the sidelink communication is unicast.

12. A first device for performing wireless communication, the first device comprising:
one or more memories storing instructions;
one or more transceivers; and
one or more processors connected to the one or more memories and the one or more transceivers, wherein the one or more processors execute the instructions to:
obtain sidelink (SL) discontinuous reception (DRX) configuration;
start an SL DRX on-duration timer of the SL DRX configuration;
receive first sidelink control information (SCI) for scheduling of a physical sidelink shared channel (PSSCH), from a second device, through a physical sidelink control channel (PSCCH);
receive a medium access control (MAC) protocol data unit (PDU) and second SCI including a 16-bit layer (L)1 destination identifier (ID) and an 8-bit L1 source ID, from the second device, through the PSSCH;
compare the L1 destination ID and a 16 least significant bit (LSB) of an L2 source ID of the first device;
compare the L1 source ID and an 8 LSB of an L2 destination ID of the first device; and
start an SL DRX inactivity timer of the SL DRX configuration, based on the L1 destination ID beingis the same as the 16 LSB of the L2 source ID, and the L1 source ID being the same as the 8 LSB of the L2 destination ID.

13. A device adapted to control a first user equipment (UE), the device comprising:
one or more processors; and
one or more memories operably connectable to the one or more processors and storing instructions, wherein the one or more processors execute the instructions to:
obtain sidelink (SL) discontinuous reception (DRX) configuration;
start an SL DRX on-duration timer of the SL DRX configuration;
receive first sidelink control information (SCI) for scheduling of a physical sidelink shared channel (PSSCH), from a second UE, through a physical sidelink control channel (PSCCH);
receive a medium access control (MAC) protocol data unit (PDU) and second SCI including a 16-bit layer (L)1 destination identifier (ID) and an 8-bit L1 source ID, from the second UE, through the PSSCH;
compare the L1 destination ID and a 16 least significant bit (LSB) of an L2 source ID of the first UE;
compare the L1 source ID and an 8 LSB of an L2 destination ID of the first UE; and
start an SL DRX inactivity timer of the SL DRX configuration, based on the L1 destination ID beingis the same as the 16 LSB of the L2 source ID, and the L1 source ID being the same as the 8 LSB of the L2 destination ID.

* * * * *